US012140893B2

(12) United States Patent
Sako

(10) Patent No.: US 12,140,893 B2
(45) Date of Patent: Nov. 12, 2024

(54) IMAGE FORMING APPARATUS

(71) Applicant: CANON KABUSHIKI KAISHA, Tokyo (JP)

(72) Inventor: Masato Sako, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/166,982

(22) Filed: Feb. 9, 2023

(65) Prior Publication Data

US 2023/0273552 A1 Aug. 31, 2023

(30) Foreign Application Priority Data

Feb. 25, 2022 (JP) ................................ 2022-027677

(51) Int. Cl.
*G03G 15/20* (2006.01)
*G03G 15/00* (2006.01)

(52) U.S. Cl.
CPC ....... *G03G 15/205* (2013.01); *G03G 15/2064* (2013.01); *G03G 15/5004* (2013.01); *G03G 2215/00599* (2013.01)

(58) Field of Classification Search
USPC ........................................................... 399/69
See application file for complete search history.

(56) References Cited

U.S. PATENT DOCUMENTS

2013/0004193 A1* 1/2013 Park .................. G03G 15/2028 399/69
2017/0371277 A1* 12/2017 Oonishi ............ G03G 15/5029
2018/0348681 A1* 12/2018 Yamaguchi ........ G03G 15/2039

FOREIGN PATENT DOCUMENTS

JP H11282308 A 10/1999
JP 2005003818 A 1/2005
JP 2010151909 A 7/2010

* cited by examiner

*Primary Examiner* — Quana Grainger
(74) *Attorney, Agent, or Firm* — Canon U.S.A., Inc. IP Division

(57) ABSTRACT

An image forming apparatus includes an image forming unit, a fixing unit, and a control unit. The image forming unit forms a toner image on a recording material. The fixing unit heats and fix the toner image formed on the recording material to the recording material in a fixing nip portion. The fixing unit includes a heater and a nip portion forming member that forms the fixing nip portion to pinch and convey the recording material. The control unit control the power to be supplied to the heater so as to change a temperature gradient at time of warm-up of the fixing unit to a target temperature in accordance with time from start of power supply to the heater until entry of the recording material into the fixing nip portion.

13 Claims, 21 Drawing Sheets

FIG.6

WARM-UP PROCESS

FILM PID CONTROLLER

| Δts [sec] | α [°C/sec] | Kfp | Kfi | Kfd | Cf |
|---|---|---|---|---|---|
| 5.14s = Δts | 31 | 5.5 | 1.3 | 0.3 | 260 |
| 6.12s > Δts > 5.14s | 29 | 5.4 | 1.2 | 0.2 | 230 |
| Δts ≥ 6.12s | 26 | 5.3 | 1.1 | 0.1 | 200 |

HEATER PID CONTROLLER

| Khp | Kfi | Kfd | Cf |
|---|---|---|---|
| 2.4 | 0.15 | 0 | 54 |

SHEET-PASSING PROCESS

FILM PID CONTROLLER

| Kfp | Kfi | Kfd | Cf |
|---|---|---|---|
| 3.5 | 0.8 | 0.1 | 240 |

HEATER PID CONTROLLER

| Khp | Kfi | Kfd | Cf |
|---|---|---|---|
| 1.5 | 0.09 | 0 | 30 |

FIG.8

WARM-UP PROCESS

FILM PID CONTROLLER

| Kfp | Kfi | Kfd | Cf |
|---|---|---|---|
| 5.3 | 1.1 | 0.1 | 200 |

HEATER PID CONTROLLER

| Khp | Kfi | Kfd | Cf |
|---|---|---|---|
| 2.4 | 0.15 | 0 | 54 |

SHEET-PASSING PROCESS

FILM PID CONTROLLER

| Kfp | Kfi | Kfd | Cf |
|---|---|---|---|
| 3.5 | 0.8 | 0.1 | 240 |

HEATER PID CONTROLLER

| Khp | Kfi | Kfd | Cf |
|---|---|---|---|
| 1.5 | 0.09 | 0 | 30 |

FIG.10

WARM-UP PROCESS

| Δts [sec] | α [°C/sec] | Kp | Ki | Kd | C |
|---|---|---|---|---|---|
| 5.14s = Δts | 31 | 8.35 | 2.5 | 1.7 | 22 |
| 5.46s > Δts > 5.14s | 30 | 6 | 1.8 | 1.2 | 16 |
| Δts ≥ 5.46s | 29 | 5 | 1.5 | 1 | 13 |

SHEET-PASSING PROCESS

| Kp | Ki | Kd | C |
|---|---|---|---|
| 4.2 | 1.26 | 0.84 | 35 |

FIG.12

WARM-UP PROCESS

| Kp | Ki | Kd | C |
|---|---|---|---|
| 5 | 1.5 | 1 | 13 |

SHEET-PASSING PROCESS

| Kp | Ki | Kd | C |
|---|---|---|---|
| 4.2 | 1.26 | 0.84 | 35 |

IMAGE FORMING APPARATUS

BACKGROUND

Field

The present disclosure relates to an electrophotographic image forming apparatus such as a copying machine and a printer.

Description of the Related Art

An electrophotographic image forming apparatus forms a toner image on a recording material such as plain paper, and includes a fixing unit that fixes the toner image formed on the recording material to the recording material. To fix the toner image to the recording material, a temperature of the fixing unit needs to reach a target temperature by the time the conveyed recording material arrives at the fixing unit. When the fixing unit is warmed up so that the temperature thereof reaches the target temperature, overshooting occurs where the temperature of the fixing unit exceeds the target temperature. When an amount of overshooting is too large, the fixing unit excessively heats the toner image on the recording material that has arrived at the fixing unit, and hot offset occurs where toner adheres to the fixing unit. Hence, it is necessary to keep the amount of overshooting small.

As a method for reducing the amount of overshooting at the time of warm-up, Japanese Patent Application Laid-Open No. 11-282308 discusses setting different values as parameters for proportional-integral-derivative (PID) control in a warm-up process and for PID control in a fixing process (constant temperature control process). This is to differentiate the value of the parameter of PID control in the warm-up process from the value of the parameter of PID control at the time of fixing processing to reduce overshooting.

Meanwhile, in late years, reduction of first print out time (FPOT), which is time since a print instruction is given until a recording material on which a toner image is formed is discharged to the outside of an apparatus, has been desired. The reduction of the FPOT requires reduction of time spent for warming up the fixing unit. To that end, power to be supplied to a heater mounted on the fixing unit is controlled so that a rate of temperature rise of the fixing unit becomes higher at the time of warm-up. At the same time, the rate of temperature rising is set so that the amount of overshooting becomes not too large.

However, in a case where an entry timing of the recording material into the fixing unit is delayed due to some sort of factors at the time of warm-up of the fixing unit to increase the rate of temperature rising, the overshooting occurs.

SUMMARY

The present disclosure is directed to provision of an image forming apparatus capable of preventing an amount of overshooting from increasing while reducing first print out time (FPOT).

According to an aspect of the present disclosure, an image forming apparatus includes an image forming unit configured to form a toner image on a recording material, a fixing unit configured to heat and fix the toner image formed on the recording material to the recording material in a fixing nip portion, wherein the fixing unit includes a heater and a nip portion forming member that forms the fixing nip portion to pinch and convey the recording material, and a control unit configured to control power to be supplied to the heater, wherein the control unit is configured to control the power to be supplied to the heater so as to change a temperature gradient at time of warm-up of the fixing unit to a target temperature in accordance with time from start of power supply to the heater until entry of the recording material into the fixing nip portion.

Further features of the present disclosure will become apparent from the following description of exemplary embodiments with reference to the attached drawings.

BRIEF DESCRIPTION OF THE DRAWINGS

FIG. 6 is a diagram illustrating control parameters according to the first exemplary embodiment.

FIG. 8 is a diagram illustrating control parameters according to a comparative example for the first exemplary embodiment.

FIG. 10 is a diagram illustrating control parameters according to a second exemplary embodiment.

FIG. 12 is a diagram illustrating control parameters according to a comparative example for the second exemplary embodiment.

DESCRIPTION OF THE EMBODIMENTS

Modes for implementing the present disclosure will be described in detail below by example based on exemplary embodiments with reference to the drawings.

Dimensions, materials, shapes, relative positions, and the like of components described in the exemplary embodiments should be changed as appropriate depending on a configuration of an apparatus to which the present disclosure is applied and various conditions. That is, the following exemplary embodiments are not intended to limit the scope of the present disclosure.

(Description About Whole of Image Forming Apparatus)

Figure 1:
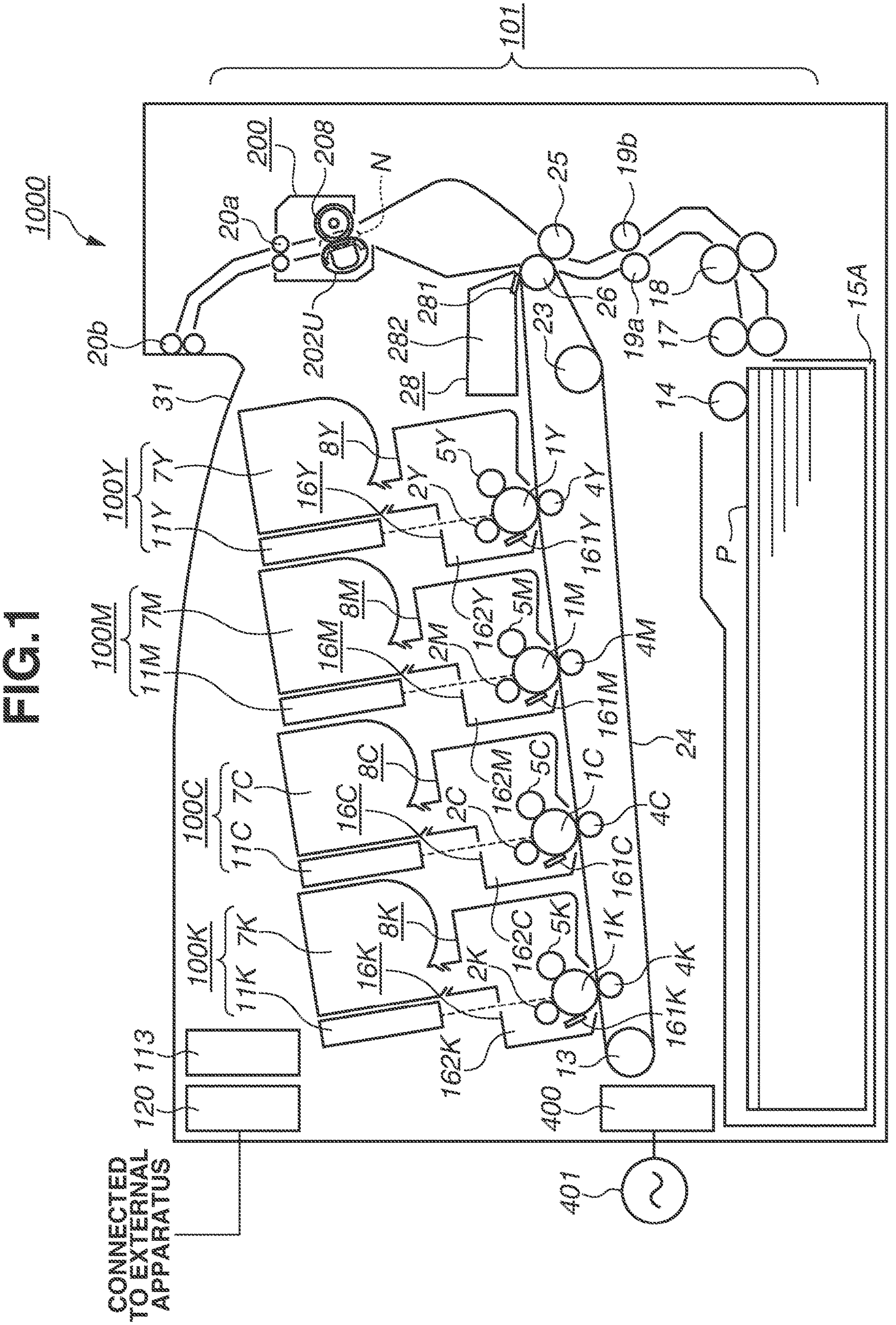
FIG. 1 is a cross-sectional view of an image forming apparatus.

A first exemplary embodiment will now be described. FIG. 1 is a cross-sectional view of an electrophotographic image forming apparatus 1000. Each of characters of Y, M, C, and K added at the end of a reference number represents a color of toner and is omitted when a matter common to four colors is described.

The image forming apparatus 1000 is an in-line full-color printer in which four photosensitive drums 1 are aligned. The image forming apparatus 1000 is equipped with an automatic duplex printing mechanism, and a resolution is 600 dpi.

An image forming unit 101 that forms a toner image on a recording material includes four image forming stations 100Y, 100M, 100C, and 100K. Each image forming station 100 includes a photosensitive drum 1, a charge roller 2 as a primary charging unit, a laser scanner unit 11, a developing unit 8, a toner container 7 as a toner supply unit, a primary transfer roller 4, and a drum cleaner 16. The image forming unit 101 further includes an intermediate transfer belt 24, a secondary transfer roller 25, a driving roller 26, a stretching roller 13, and an auxiliary roller 23. The driving roller 26 functions as a facing roller that faces the secondary transfer roller 25 while driving the intermediate transfer belt 24.

A fixing unit 200 fixes a toner image formed on a recording material P to the recording material P. FIG. 1 also illustrates an engine controller 113 and a video controller 120. The engine controller 113 is connected to the video controller 120, and controls each unit of the image forming apparatus 1000 in response to an instruction from the video controller 120. A heater control circuit 400 is connected to a commercial alternating-current power source 401.

Upon receiving a print instruction from an external apparatus, the video controller 120 starts processing of converting image data received from the external apparatus into printable image data. The video controller 120 transmits an instruction to start image forming (hereinafter referred to as a print start command) to the engine controller 113.

The transmission of the print start command from the video controller 120 starts an operation for warming up the fixing unit 200 and motor driving of the laser scanner unit 11. The recording material P is sent out from a sheet feeding cassette 15A by a pickup roller 14 and sheet feeding rollers 17 and 18 to the inside of the image forming apparatus 1000. The recording material P is temporarily pinched by a conveyance (registration) roller 19*a* and a conveyance (registration) facing roller 19*b*, which are used for synchronizing an image forming operation and conveyance of the recording material P. The recording material P then stops and is brought into a stand-by state. The image forming operation will be described below.

Thereafter, the processing of converting image data in the video controller 120 ends. When the image data is transmitted to the engine controller 113, the engine controller 113 gives an instruction to start a print sequence. When the received image data is full-color data in yellow (Y), magenta (M), cyan (C), and black (K), the engine controller 113 controls the image forming unit 101 in a YTOP mode. When the received image data is monochrome data in only K, the engine controller 113 controls the image forming unit 101 in a KTOP mode.

First, image forming in the YTOP mode will be described. The laser scanner unit 11 scans the surface of the photosensitive drum 1 that is charged to a constant potential by the action of the charge roller 2 with laser light, and forms an electrostatic-latent image on the photosensitive drum 1. A developing roller 5 is arranged in the developing unit 8. A bias voltage for supplying toner to the photosensitive drum 1 is applied to the developing roller 5. The electro-static latent image formed on the surface of the photosensitive drum 1 is developed with toner supplied from the developing unit 8. With this operation, toner images in mutually different colors are formed on the respective four photosensitive drums 1.

An intermediate transfer belt 24 is in contact with the photosensitive drums 1, and rotates in synchronization with the rotation of the photosensitive drums 1. The toner images formed on the respective four photosensitive drums 1 are sequentially transferred to the intermediate transfer belt 24 by the action of primary transfer bias applied to the primary transfer roller 4. With this operation, a toner image (full-color image) in which four colors are superimposed is formed on the intermediate transfer belt 24. Residual toner, which is not transferred to the intermediate transfer belt 24 and remaining on the photosensitive drums 1, is collected by drum cleaners 16. The drum cleaners 16 include respective cleaner blades 161 in contact with the respective photosensitive drums 1 and respective toner collecting containers 162.

The full-color image formed on the intermediate transfer belt 24 is conveyed to a secondary transfer nip portion formed by the intermediate transfer belt 24 and the secondary transfer roller 25. In synchronization with the conveyance, the recording material P on stand-by in a state of being pinched by a pair of the conveyance rollers 19*a* and 19*b* is conveyed to the secondary transfer nip portion by the action of the pair of the conveyance rollers 19*a* and 19*b*. The toner image is collectively transferred to the recording material P by the action of secondary transfer bias applied to the secondary transfer roller 25.

The fixing unit 200 includes a film unit (heating unit) 200U and a pressure roller 208 that forms a fixing nip portion N together with the film unit 200U. The recording material P that holds a toner image T is conveyed by the pressure roller 208 to be heated and pressured in the fixing nip portion N. With this operation, the toner image T is fixed to the recording material P. The recording material P subjected to fixing processing and to which the toner image T has been fixed is discharged to a discharge tray 31 by discharge rollers 20*a* and 20*b*, and the image forming operation ends.

A belt cleaner 28 cleans toner remaining on the intermediate transfer belt 24 by the action of a cleaner blade 281, and the toner collected by the belt cleaner 28 is accumulated as waste toner in a cleaner container 282.

Next, image forming in the KTOP mode will be described. The KTOP mode is different from the YTOP mode in that development is performed only in the image forming station 100K, and the other processes are similar to those in the YTOP mode. Since there is no need for image forming in the image forming stations 100Y, 100M, and 100C except the image forming station 100K, time required for image forming in the KTOP mode becomes shorter than that in the YTOP mode.

The image forming apparatus 1000 has a maximum sheet-passing width of 216 mm in a width direction of the recording material P orthonormal to a conveyance direction of the recording material P, and is capable of performing print on a recording material having a letter size (216 mm×279 mm). Conveyance speed (process speed) of the recording material P can be selected by a user depending on a type of the recording material P, and two types of 300 mm/s, and 150 mm/s are prepared.

(Description About Fixing Unit)

Figure 2:
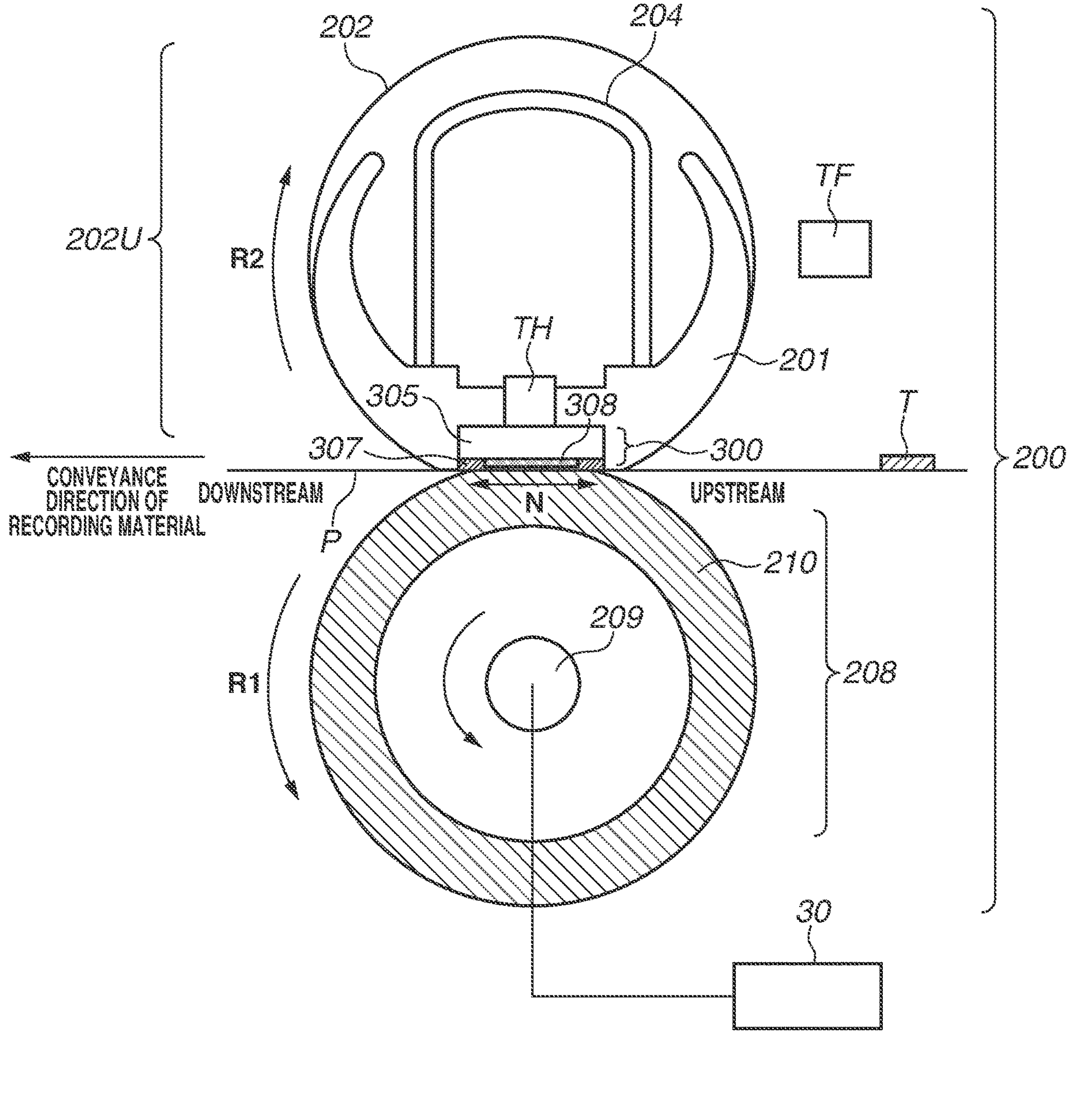
FIG. 2 is a cross-sectional view of a fixing unit according to a first exemplary embodiment.

FIG. 2 is a cross-sectional view of the fixing unit (fixing portion) 200. The fixing unit 200 includes the film unit (heating unit) 200U and the pressure roller 208 that forms the fixing nip portion N together with the film unit 200U.

The film unit 200U includes a fixing film 202 that has a cylindrical shape, and a heater 300 that is arranged in an internal space of the fixing film 202 and in contact with an inner surface of the fixing film 202. The fixing nip portion N is formed by the pressure roller 208 together with the heater 300 via the fixing film 202.

The fixing film 202 is a cylindrical, multi-layered heat-resistant film, and a base layer of the fixing film 202 is made of a thin, heat-resistant resin such as polyimide or a metal such as stainless-steel. On the surface of the fixing film 202, arranged is a release layer made of a tetrafluoroethylene-perfluoro alkyl vinyl ether copolymer (PFA) or the like to prevent adhesion of toner and ensure separativeness from the recording material P. Furthermore, a heat-resistant rubber layer made of silicone rubber or the like is arranged between the base layer and the release layer.

The pressure roller 208 includes a metal core 209 made of iron, aluminum, or the like, and an elastic layer 210 made of silicone rubber or the like. In addition, a release layer is arranged on the surface of the pressure roller 208, similarly to the fixing film 202. The pressure roller 208 is in contact with an outer peripheral surface of the fixing film 202.

The heater 300 includes a ceramic substrate 305, a heat generation resistor 302 arranged on the substrate 305 in a longitudinal direction of the substrate 305, and a surface protecting layer 308, which is a glass layer covering the heat generation resistor 302. The heater 300 is arranged in the internal space of the fixing film 202 along the longitudinal direction of the fixing film 202. Details of the heater 300 will be described below. A heater holding member 201 is made of a heat-resistant resin such as a liquid crystal polymer and arranged in the internal space of the fixing film 202 along the longitudinal direction of the fixing film 202. The heater 300 is held by the heater holding member 201. The heater holding member 201 also has a guide function for guiding rotation of the fixing film 202.

A metal stay 204 reinforces the heater holding member 201, and is arranged in the internal space of the fixing film 202 along the longitudinal direction of the fixing film 202. The metal stay 204 urges the heater holding member 201 that holds the heater 300 with a spring, which is not illustrated, toward the pressure roller 208. With this pressure, the fixing nip portion is formed between the fixing film 202 and the pressure roller 208. A temperature of the heater 300 is detected by a thermistor (temperature detection element) TH. The thermistor TH detects a temperature of a substantially central portion of the heater 300 in the longitudinal direction of the heater 300. A temperature of the fixing film 202 is detected by a thermopile (temperature detection element) TF. The thermopile TF detects a surface temperature of a central portion of the fixing film 202 in the longitudinal direction of the fixing film 202 on the upstream side of the fixing nip portion N in the conveyance direction of the recording material P.

The pressure roller 208 supplied with motive power from a motor 30 rotates in a direction of an arrow R1. The rotation of the pressure roller 208 drives the fixing film 202 to rotate in a direction of an arrow R2. Heat of the fixing film 202 is applied to the recording material P while the recording material P is pinched and conveyed by the fixing nip portion N, whereby the toner image T on the recording material P is heated and fixed to the recording material P. In the present exemplary embodiment, the fixing film 202, the heater 300, the pressure roller 208, and the like correspond to a nip portion forming member that forms the fixing nip portion N that nips and coveys the recording material P.

(Description About Heater)

Figure 3:
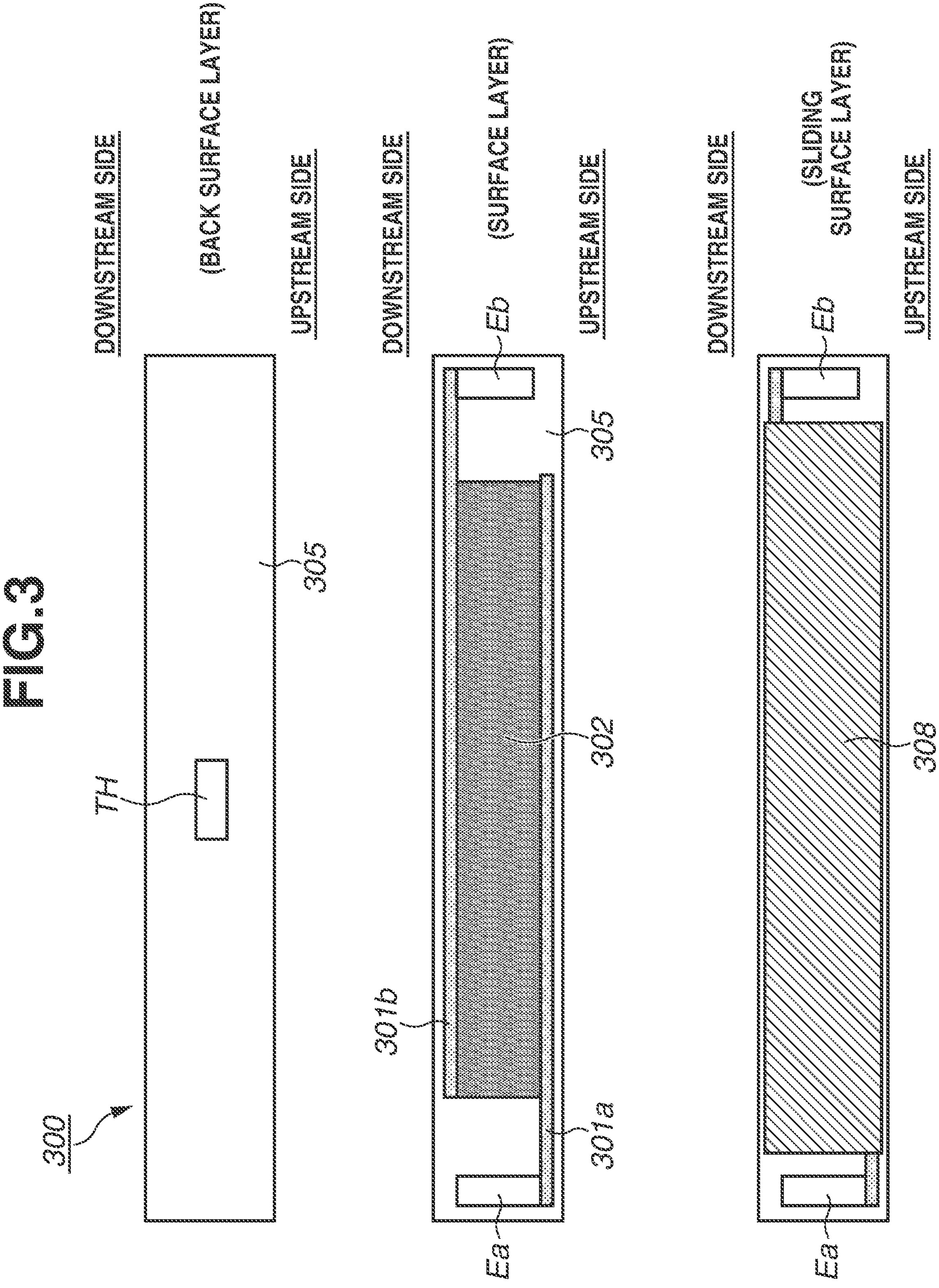
FIG. 3 is a configuration diagram of a heater according to the first exemplary embodiment.

FIG. 3 is a configuration diagram of the heater 300. The heater 300 includes a conductor 301 (301*a* and 301*b*) arranged on the substrate 305 along the longitudinal direction of the substrate 305. The conductor 301 is separated into the conductor 301*a* arranged on the upstream side in the conveyance direction of the recording material P, and the conductor 301*b* arranged on the downstream side in the conveyance direction of the recording material P. Between the conductors 301*a* and 301*b*, arranged is a heat generation resistor 302 that generates heat using power supplied via the conductors 301*a* and 301*b*. Electrodes Ea and Eb are portions to which respective terminals of a power supply connector, which is not illustrated, are connected. The surface protecting layer 308, which is a glass layer, is a surface in contact with the fixing film 202. The surface protecting layer 308 covers the heat generation resistor 302 so that the electrodes Ea and Eb are exposed. The thermistor TH is arranged so as to be in contact with a back surface layer of the heater 300 (a surface on the opposite side of a sliding surface) at the central portion of the heater 300 in the longitudinal direction of the heater 300.

(Description About Control Circuit)

Figure 4:
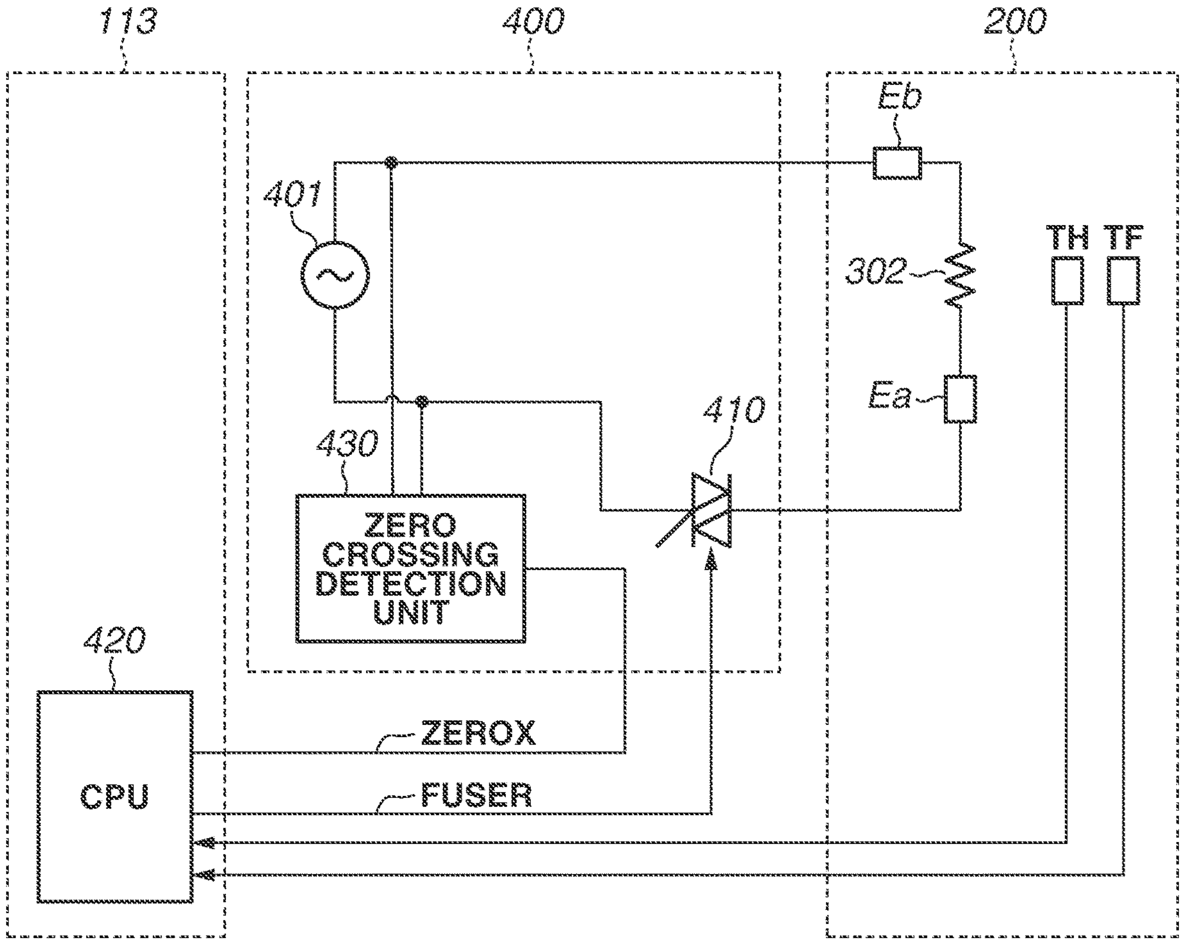
FIG. 4 is a circuit diagram for controlling the heater according to the first exemplary embodiment.

FIG. 4 is a circuit diagram of the heater control circuit 400. The image forming apparatus 1000 is connected to the commercial alternating-current power source 401. Power control of the heater 300 is performed by the engine controller 113 controlling a triac 410. The triac 410 operates in accordance with a FUSER signal from a central processing unit (CPU) 420 (control unit) built into the engine controller 113. A zero crossing detection unit 430 is a circuit that detects zero crossing of alternating-current waveforms of the alternating-current power source 401, and outputs a ZEROX signal to the CPU 420. The ZEROX signal is used as a reference signal for phase control and wavenumber control with the triac 410.

The CPU 420 calculates a control duty ratio D (%) corresponding to power to be supplied to the heater 300 in a predetermined computation cycle. The present exemplary embodiment employs cascade proportional-integral-derivative (PID) control for controlling both the temperature of the fixing film 202 and the temperature of the heater 300. Specifically, the CPU 420 calculates a target temperature Htgt of the heater 300 based on a difference ΔTf between a target temperature Ttgt of the fixing film 202 and a temperature detected by the thermopile TF. The CPU 420 then calculates the control duty ratio D based on a difference ΔTh between the target temperature Htgt of the heater 300 and a temperature detected by the thermistor TH. In the present exemplary embodiment, a controller that performs the former control is referred to as a film PID controller, and a controller that performs the latter control is referred to as a heater PID controller.

The CPU 420 calculates the target temperature Htgt of the heater 300 using P gain Kfp, I gain Kfi, D gain Kfd, and a constant term Cf based on the following Expression (1), $$\mathrm{Htgt}=Kfp\times\Delta Tf+Kfi\times\int\Delta Tf dt+Kfd\times d\Delta Tf/dt+Cf \quad (1).$$

However, to prevent breakage of the heater 300 due to excessive temperature rise of the heater 300, an upper limit is set to the target temperature Htgt of the heater 300. In the present exemplary embodiment, the upper limit is 290° C.

In addition, the CPU 420 calculates the control duty ratio D using P gain Khp, I gain Khi, D gain Khd, and a constant term Ch based on the following Expression (2), $$D=Khp\times\Delta Th+Khi\times\int\Delta Thdt+Khd\times d\Delta Th/dt+Ch \quad (2).$$

A computation cycle in Expressions (1) and (2) is 80 ms.

The CPU 420 converts the control duty ratio D into a phase angle corresponding to power (phase control) or a wavenumber (wavenumber control) and outputs the FUSER signal at a timing based on the converted value to control the triac 410.

(Temperature Adjustment Control Method)

A description will be given of a temperature adjustment control method for controlling temperature rising of the fixing film 202 from a temperature Tini at the start of power supply to the heater 300 to the target temperature Ttgt, with reference to FIGS. 5, 6, and 7.

In the present exemplary embodiment, Tini is 23° C., and Ttgt is 180° C.

Figure 5A:
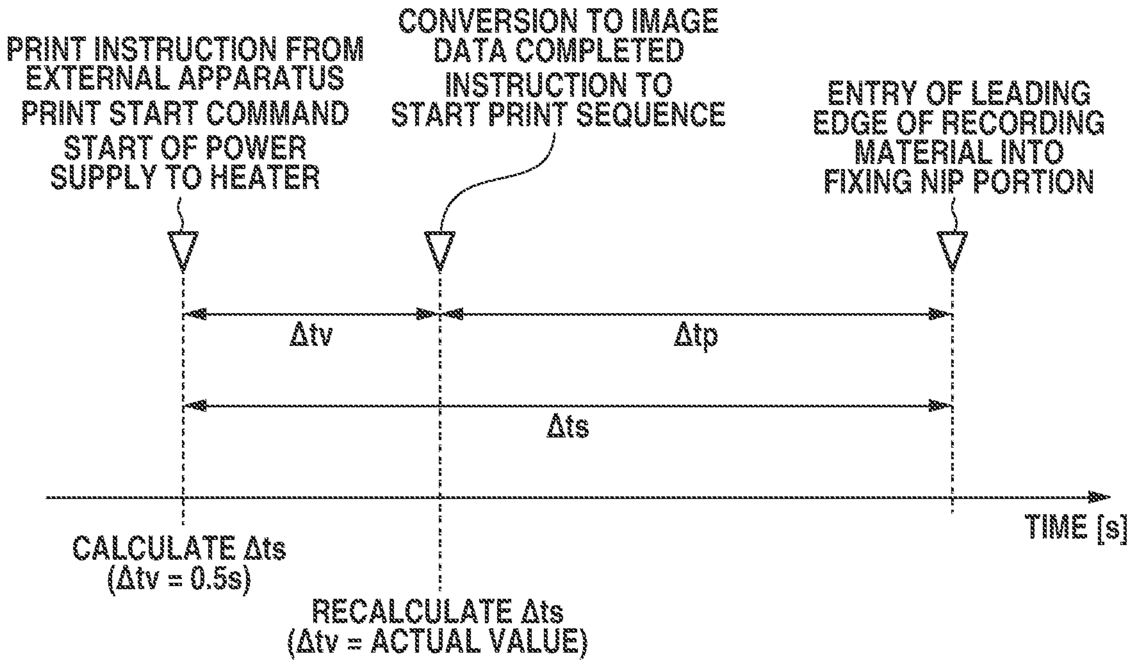
FIGS. 5A and 5B are diagrams illustrating a sequence duration Δts.

First, the sequence duration Δts and a temperature gradient α will be described. FIG. 5A is a time-series diagram for illustrating the sequence duration Δts. The sequence duration Δts is time from the start of power supply to the heater 300 until the entry of the leading edge of the recording material P in the conveyance direction into the fixing nip portion N. The sequence duration Δts is preliminarily calculated by the CPU 420 when the print start command is transmitted from the video controller 120. The sequence duration Δts is calculated by time Δtv+time Δtp. The time Δtv is time from a timing when the print start command is transmitted from the video controller 120 until image data is transmitted. The time Δtp is time required for image forming after the instruction to start the print sequence is given by the engine controller 113.

The time Δtv is temporarily set at 0.5 seconds, which is the minimum time, at the timing when the print start command is transmitted from the video controller 120. However, there is a case where processing of converting an original image to printable image data is delayed depending on an image. In this case, the time Δtv is updated to a new value at the timing when the image data is transmitted from the video controller 120.

In a case of process speed of 300 mm/s, the time Δtp is 5.62 seconds in the YTOP mode and 4.64 seconds in the KTOP mode. The sequence duration Δts is calculated by Δtv+Δtp, the time Δts in the YTOP mode is 6.12 seconds at minimum, and the time Δts in the KTOP mode is 5.14 seconds at minimum.

Figure 5B:
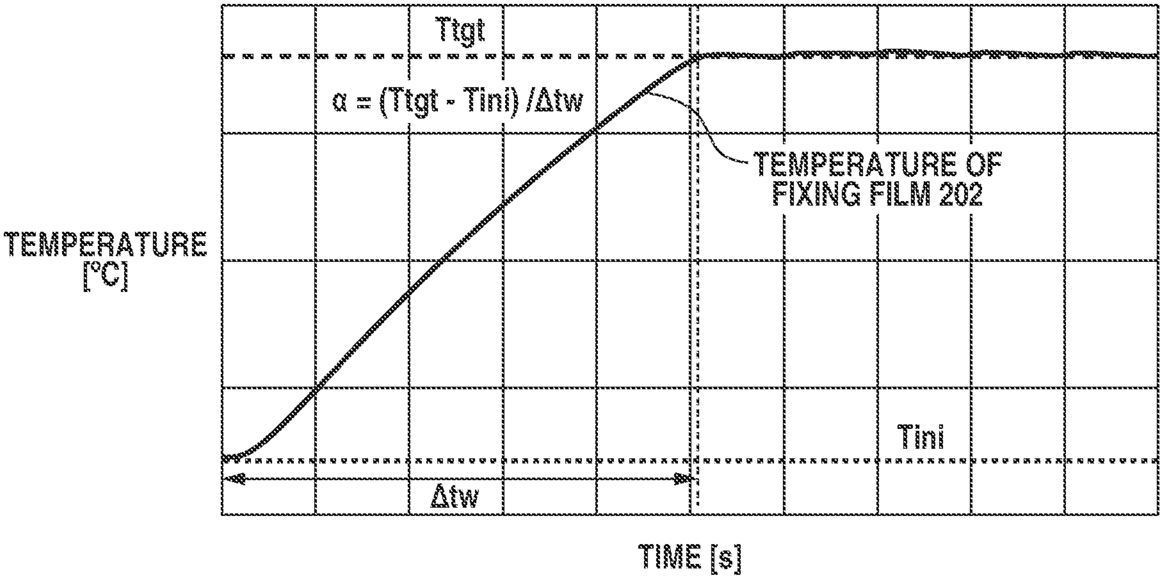

FIG. 5B is a graph indicating temperature transition of the fixing film 202 for illustrating the temperature gradient α of the fixing film 202. The temperature gradient α of the fixing film 202 is defined as (Ttgt−Tini)/Δtw. The time Δtw is time Δtw (warm-up time) from the start of power supply to the heater 300 until the temperature of the fixing film 202 reaches the target temperature Ttgt. The time Δtw is a predetermined value that has been experimented and measured using a PID control parameter, which will be described below, in a design phase of the image forming apparatus 1000.

FIG. 6 is a parameter setting table for PID control. The parameter setting table is different between before the entry of the recording material P into the fixing nip portion N (warm-up process) and after the entry of the recording material P into the fixing nip portion N (the sheet-passing process in which the recording material P passes through the fixing nip portion P). In addition, parameters Kfp, Kfi, Kfd, and Cf of the film PID controller and parameters Khp, Khi, Khd, and Ch of the heater PID controller are also different from each other. The parameters Kfp, Kfi, Kfd, and Cf of the film PID controller in the warm-up process are set so as to change the temperature gradient α in accordance with the sequence duration Δts.

Figure 7A:
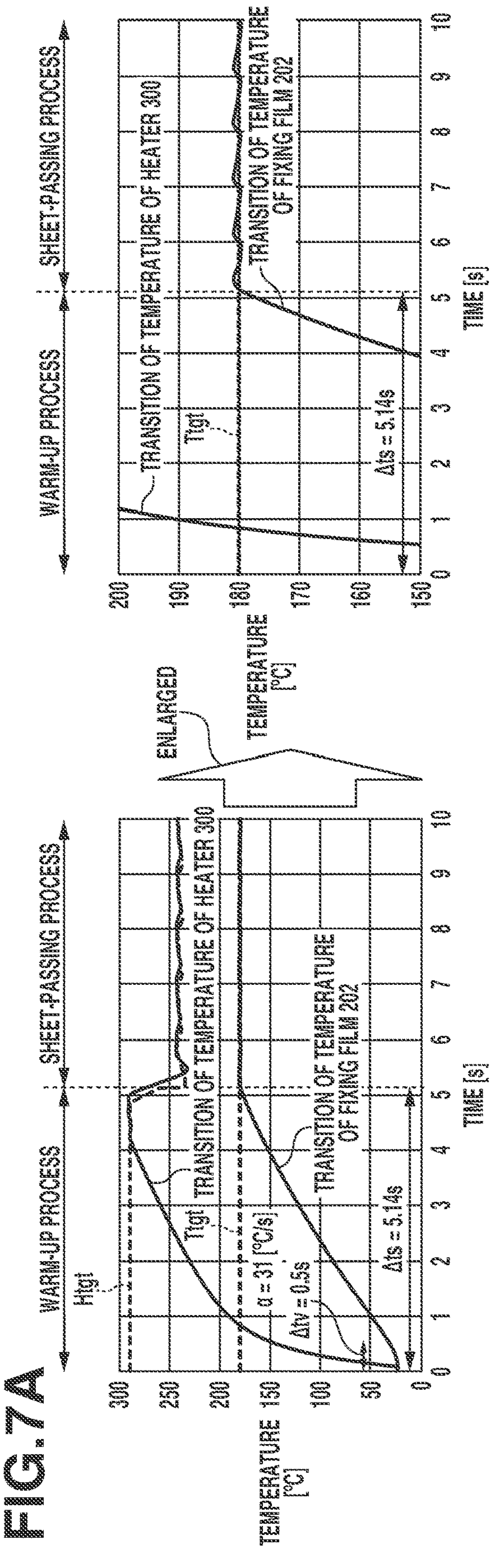
FIGS. 7A to 7E are diagram each illustrating temperature transition according to the first exemplary embodiment.
Figure 7B:
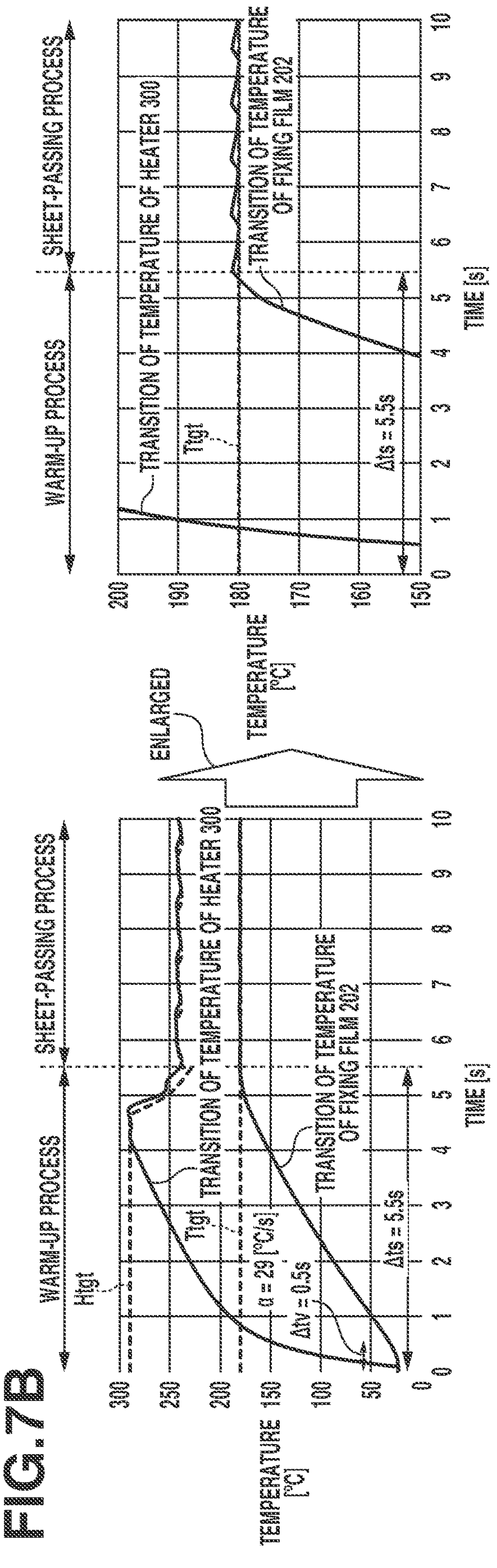
Figure 7C:
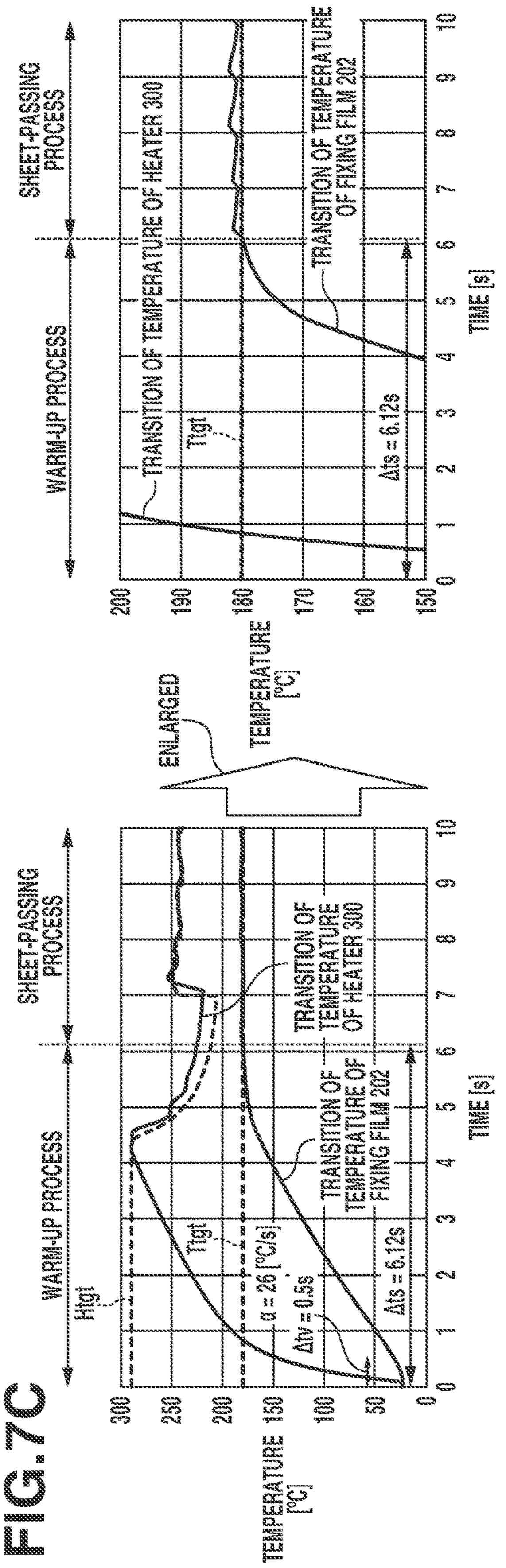
Figure 7D:
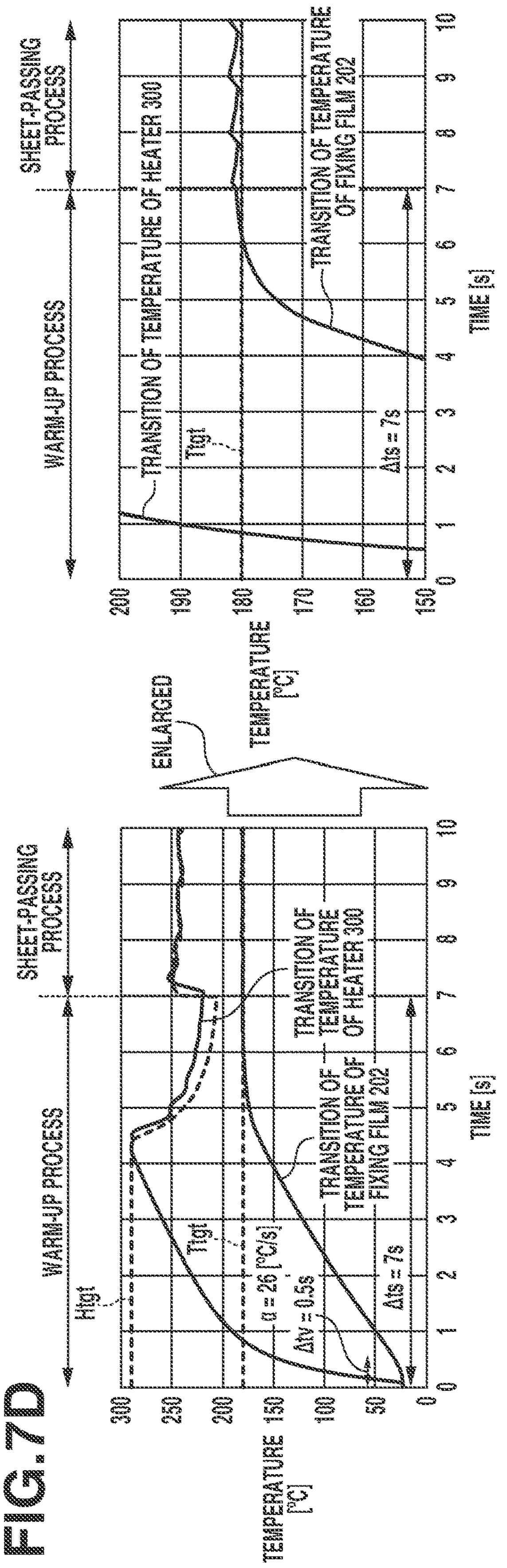
Figure 7E:
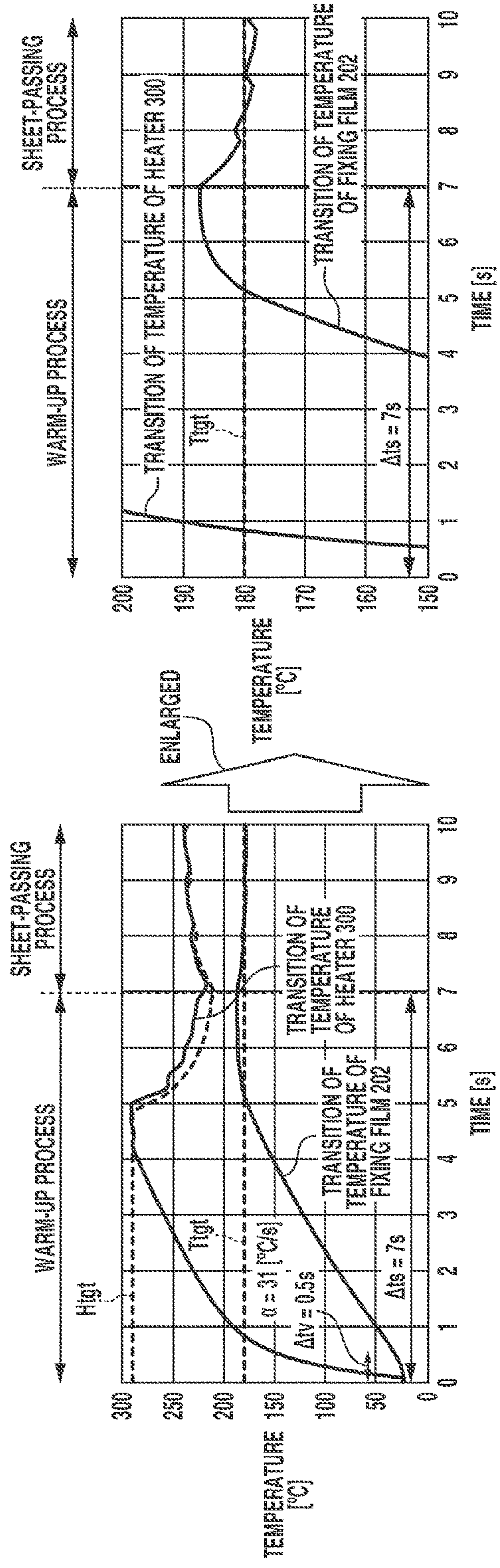
Figure 9A:
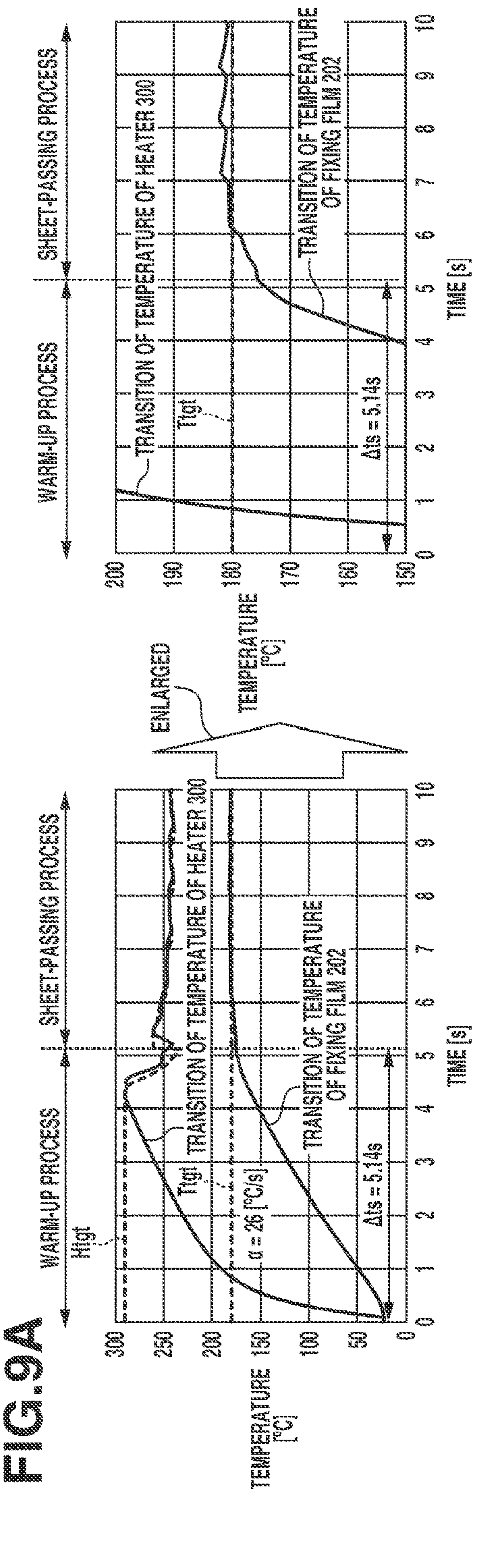
FIGS. 9A to 9D are diagrams each illustrating temperature transition according to the comparative example for the first exemplary embodiment.
Figure 9B:
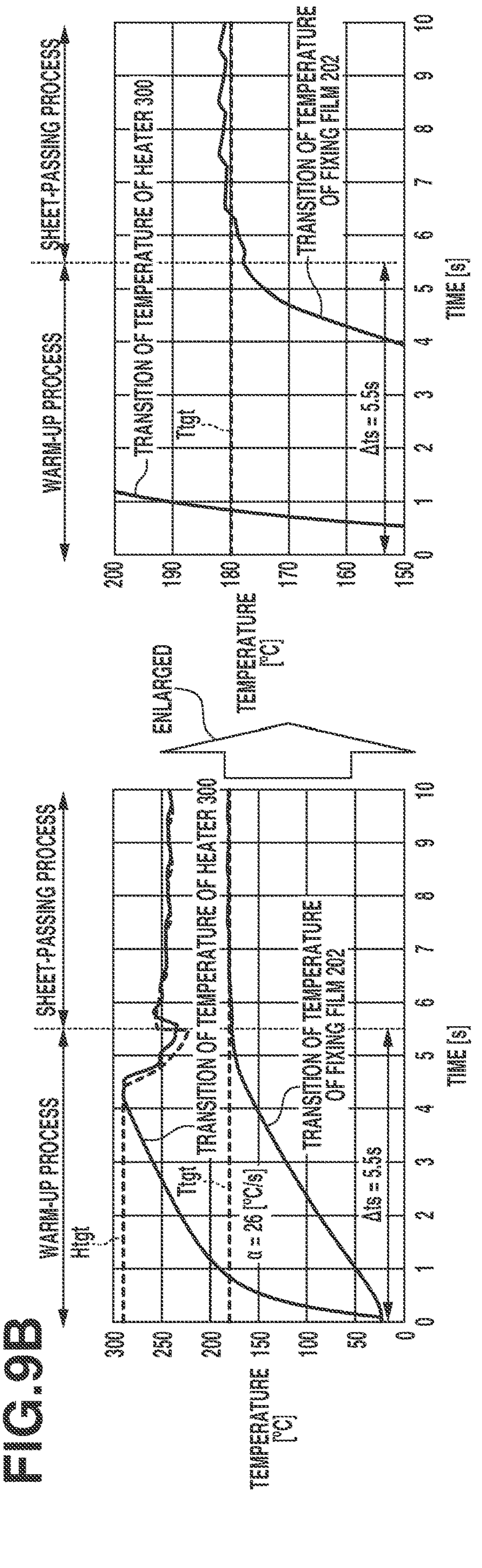
Figure 9C:
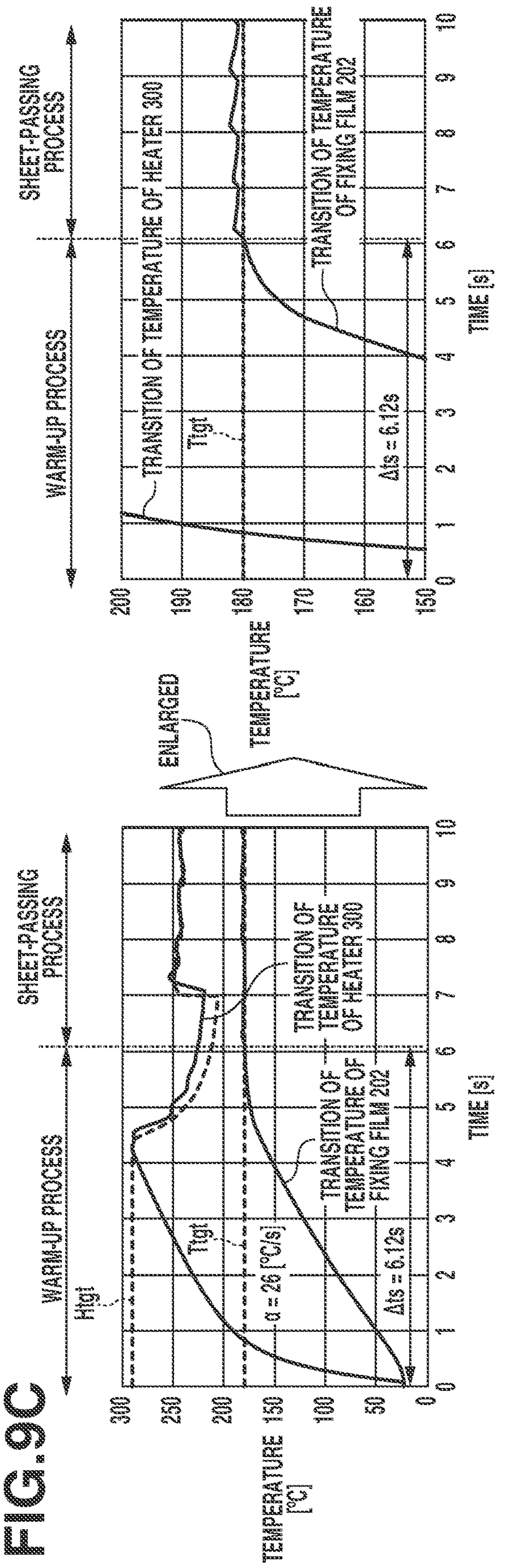
Figure 9D:
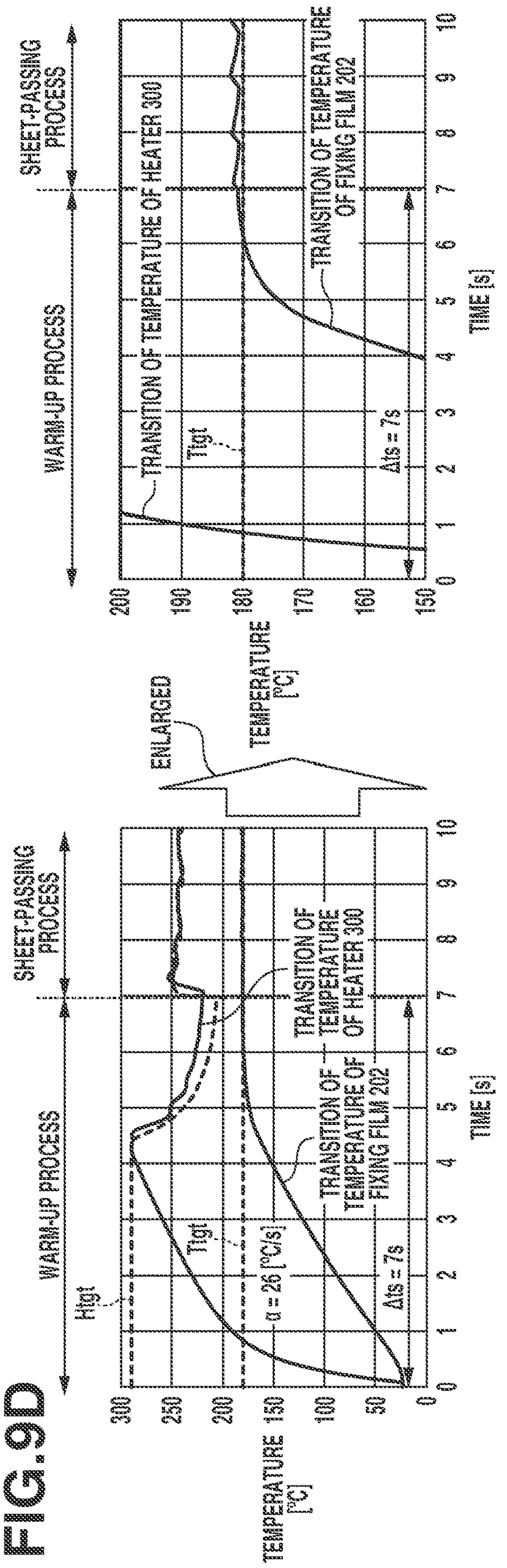

FIGS. 7A to 7E each illustrate temperature transition of temperature rise of the fixing film 202 from the start temperature Tini to the target temperature Ttgt. FIGS. 7A, 7B, 7C, and 7D illustrate temperature transition in cases where the time Δts is 5.14 seconds, 5.5 seconds, 6.12 seconds, and 7 seconds, respectively. FIG. 7E illustrates temperature transition assuming that 7 seconds are taken for the warm-up process in a control parameter setting in which the time Δts is set at 5.14 seconds. In any cases, the process speed is 300 mm/s.

In FIG. 7E, the temperature of the fixing film 202 significantly overshoots the target temperature Ttgt at the timing when the leading edge of the recording material P enters the fixing nip portion N.

In contrast, in FIGS. 7A, 7B, and 7C, it is possible to reduce the amount of overshooting of the temperature of the fixing film 202 at the timing when the leading edge of the recording material P enters the fixing nip portion N.

In FIG. 7D, a time lag occurs between the temperature rise of the fixing film 202 to the target temperature Ttgt and the entry of the recording material P into the fixing nip portion N, but it is possible to warm up the fixing film 202 without overshooting of the temperature during this time lag. In this manner, in the present exemplary embodiment, power to be supplied to the heater 300 is controlled so as to change the temperature gradient α in accordance with the time Δts at identical process speed at the time of warming up the fixing film 202 to the target temperature Ttgt.

FIG. 8 illustrates a parameter setting table for PID control according to a comparative example. As the parameters Kfp, Kfi, Kfd, and Cf of the film PID controller in the warm-up process, values in the case of the time Δts≥6.12 seconds in the present exemplary embodiment (FIG. 6) are used. That is, used are such values as that even when a state where the recording material P does not enter the fixing nip portion N continues for a long period of time, the temperature of the fixing film 202 does not overshoot the target temperature Ttgt.

FIGS. 9A to 9D each illustrate temperature transition of temperature rise of the fixing film 202 according to the comparative example from the start temperature Tini to the target temperature Ttgt. FIGS. 9A, 9B, 9C, and 9D illustrate temperature transition in cases where the time Δts is 5.14 seconds, 5.5 seconds, 6.12 seconds, and 7 seconds, respectively. Similarly to FIGS. 7A to 7E, the time Δtv is 0.5 seconds. In any cases, the process speed is 300 mm/s.

In FIGS. 9A to 9D, on the right side of a graph indicating a temperature range from 0 to 300° C., a graph indicating a temperature range from 150 to 200° C. is described in an enlarged manner. In cases of FIGS. 9A and 9B, referring to the graphs indicating the temperature range from 150 to 200° C., the recording material P enters the fixing nip portion N before the temperature of the fixing film 202 reaches the target temperature Ttgt. Hence, there is a possibility that a fixing failure occurs. To prevent such a state, the engine controller 113, in the comparative example, needs to delay the instruction to start the print sequence so that a relation of Δts≥6.12 seconds holds.

In this manner, according to the present exemplary embodiment, in a case where the time Δts is short like in the KTOP mode, it is possible to reduce the FPOT while suppressing the amount of overshooting of the temperature of the fixing film 202. Meanwhile, also in a case where the time Δts is long like in the YTOP mode, it is possible to suppress the amount of overshooting of the temperature of the fixing film 202.

As described above, the control unit controls power to be supplied to the heater so as to change the temperature gradient at the time of warm-up of the fixing unit to the target temperature in accordance with time from the start of power supply to the heater until the entry of the recording material into the fixing nip portion. Especially, the control unit controls power to be supplied to the heater so as to change the temperature gradient at the time of warm-up at identical process speed. It is possible to provide the image forming apparatus capable of preventing an increase of overshooting while reducing the FPOT.

A second exemplary embodiment is different from the first exemplary embodiment in that power supply to the heater 300 is performed by PID control using only the temperature of the fixing film 202, instead of cascade PID control for controlling both the temperature of the fixing film 202 and the temperature of the heater 300. A configuration of the image forming apparatus 1000 and a configuration of the fixing unit 200 are similar to those of the first exemplary embodiment. In the second exemplary embodiment, an output from the thermistor TH that detects the temperature of the heater 300 is used for determination of temperature abnormality in the heater 300.

(Temperature Adjustment Control Method)

The CPU 420 uses the difference ΔTf between the target temperature Ttgt of the fixing film 202 and the temperature detected by the thermopile TF in a computation cycle of 80 ms to calculate the control duty ratio D based on the following Expression (3), $$D=Kp\times\Delta Tf+Ki\times\int\Delta Tf dt+Kd\times d\Delta Tf/t+C \quad (3).$$

A description will be given of a temperature adjustment control method for controlling temperature rise of the fixing film 202 from the temperature Tini at the start of power supply to the heater 300 to the target temperature Ttgt, with reference to FIGS. 10 and 11A to 11E. In the present exemplary embodiment, Tini is 23° C., and Ttgt is 180° C.

FIG. 10 illustrates a parameter setting table for PID control according to the present exemplary embodiment. In the present exemplary embodiment, the sequence duration Δts is 5.14 seconds at minimum, and there is a possibility that the sequence duration Δts is prolonged depending on a preparation state for image forming. Parameters Kp, Ki, Kd, and C of the PID controller in the warm-up process are set so as to change the temperature gradient α in accordance with the sequence duration Δts.

Figure 11A:
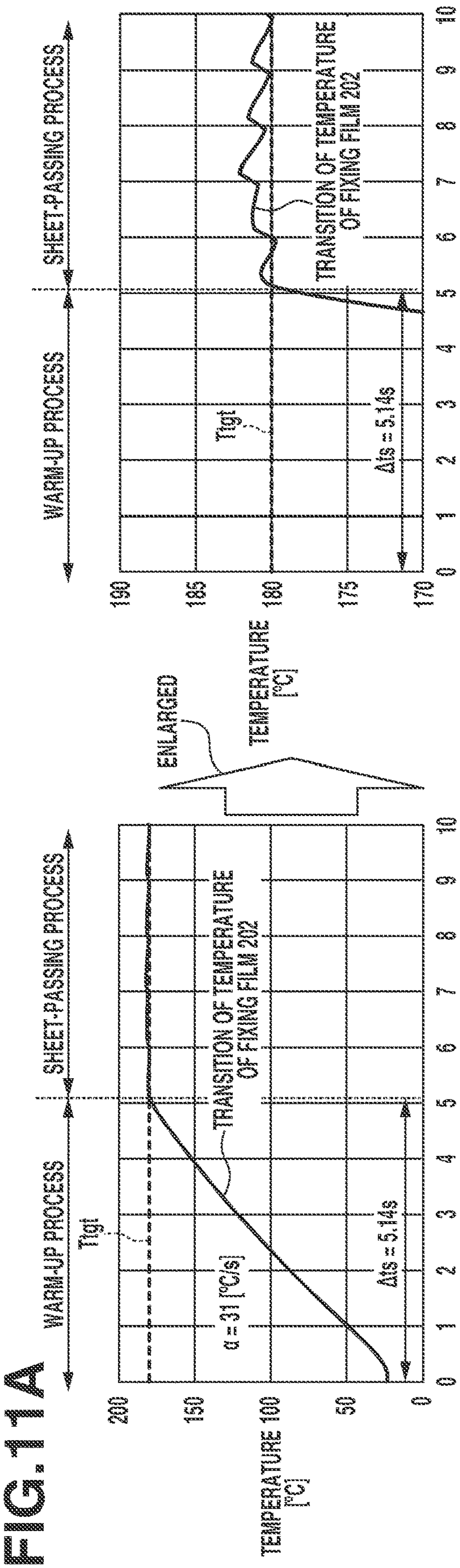
FIGS. 11A to 11E are diagrams each illustrating temperature transition according to the second exemplary embodiment.
Figure 11B:
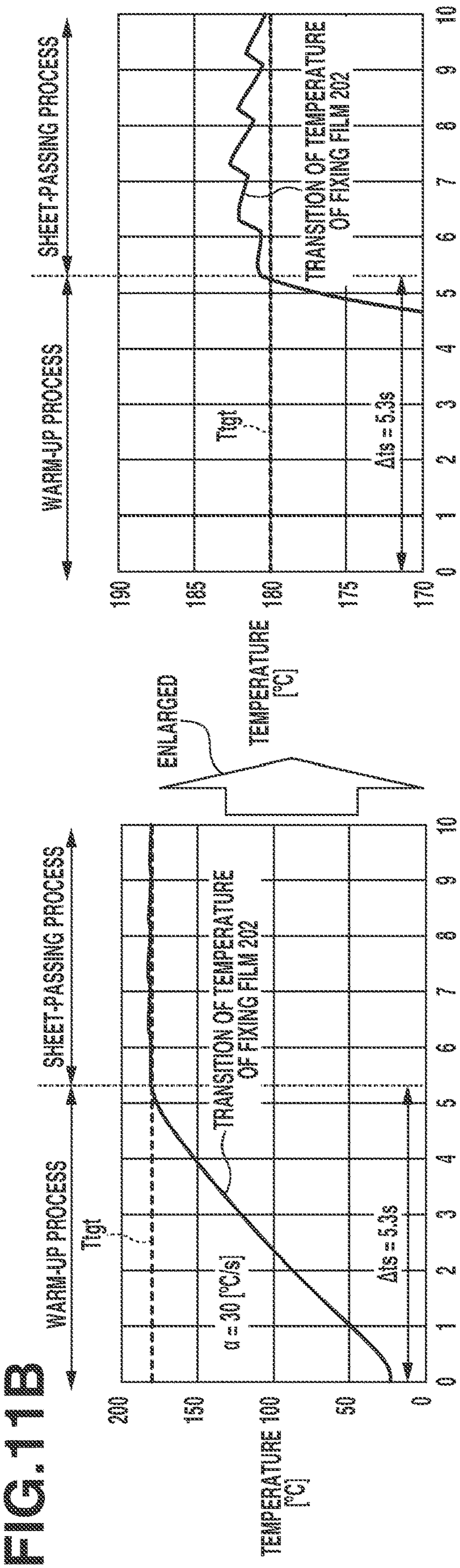
Figure 11C:
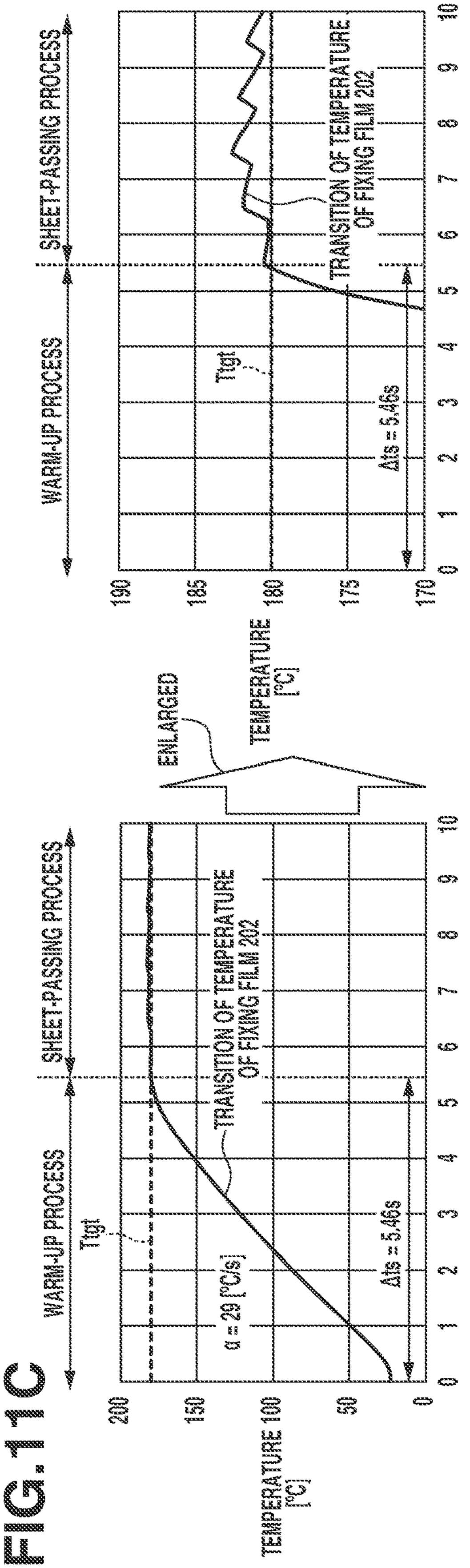
Figure 11D:
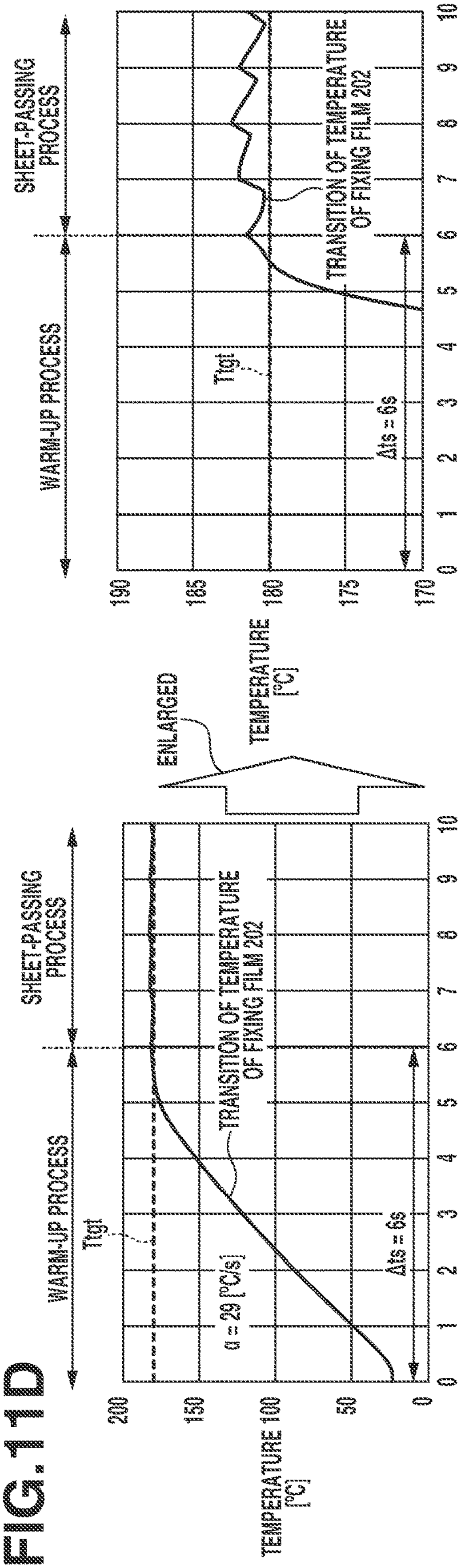
Figure 11E:
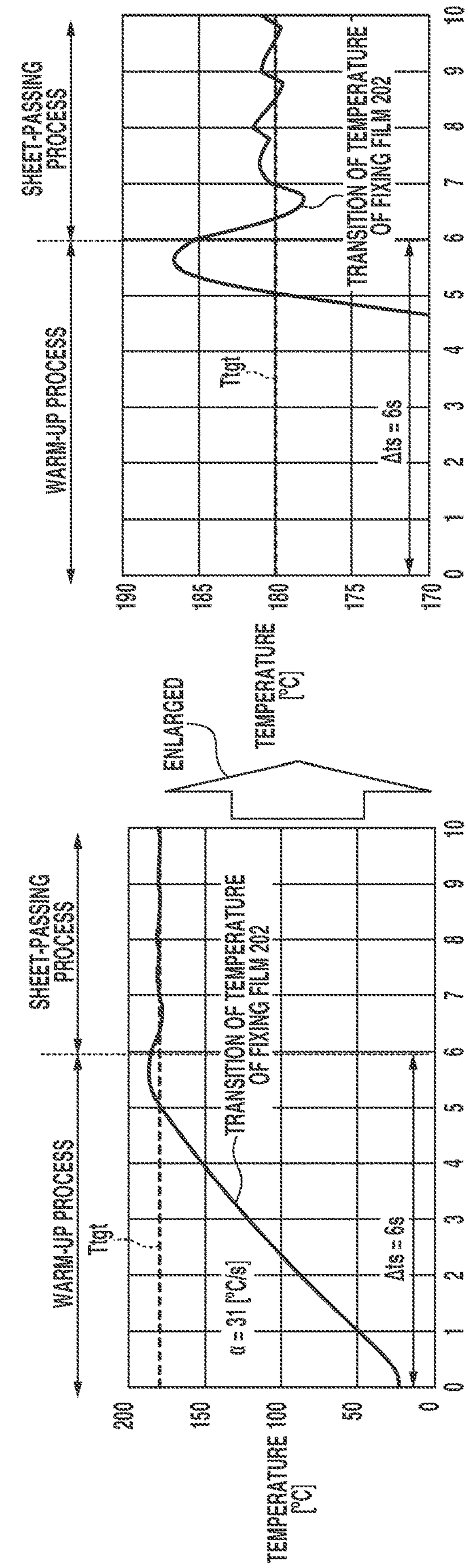

FIGS. 11A to 11E each illustrate temperature transition of temperature rise of the fixing film 202 from the start temperature Tini to the target temperature Ttgt. FIGS. 11A, 11B, 11C, and 11D illustrate temperature transition in cases where the time Δts is 5.14 seconds, 5.3 seconds, 5.46 seconds, and 6 seconds, respectively. FIG. 11E illustrates a comparative example and temperature transition assuming that 6 seconds are taken for the warm-up process in a control parameter setting in which the time Δts is set at 5.14 seconds. In any cases, the process speed is 300 mm/s.

In FIG. 11E, the temperature of the fixing film 202 significantly overshoots the target temperature Ttgt. In contrast, in FIGS. 11A, 11B, and 11C, it is possible to keep the amount of overshooting small. In FIG. 11D, a time lag occurs between the temperature rise of the fixing film 202 to the target temperature Ttgt and the entry of the recording material P into the fixing nip portion N, but it is possible to keep the amount of overshooting small during this time lag.

FIG. 12 illustrates a parameter setting table for the PID control according to the comparative example. As the parameters Kp, Ki, Kd, and C of the PID controller in the warm-up process, values that are identical to those used in the case of the time Δts≥5.46 seconds in the present exemplary embodiment (FIG. 10) are used. However, the parameters Kp, Ki, Kd, and C of the PID controller are not changed even when the time Δts varies.

FIGS. 13A to 13D each illustrate temperature transition of temperature rise of the fixing film 202 according to the comparative example from the start temperature Tini to the target temperature Ttgt. FIGS. 13A, 13B, 13C, and 13D illustrate temperature transition in cases where the time Δts is 5.14 seconds, 5.3 seconds, 5.46 seconds, and 6 seconds, respectively.

Figure 13A:
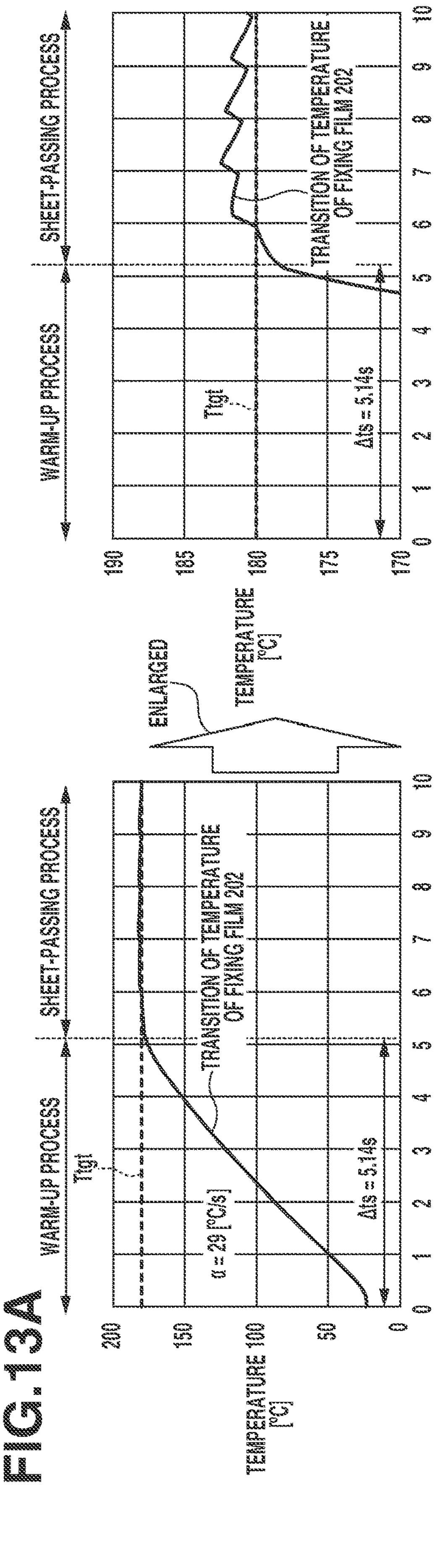
FIGS. 13A to 13D are diagrams each illustrating temperature transition according to the comparative example for the second exemplary embodiment.
Figure 13B:
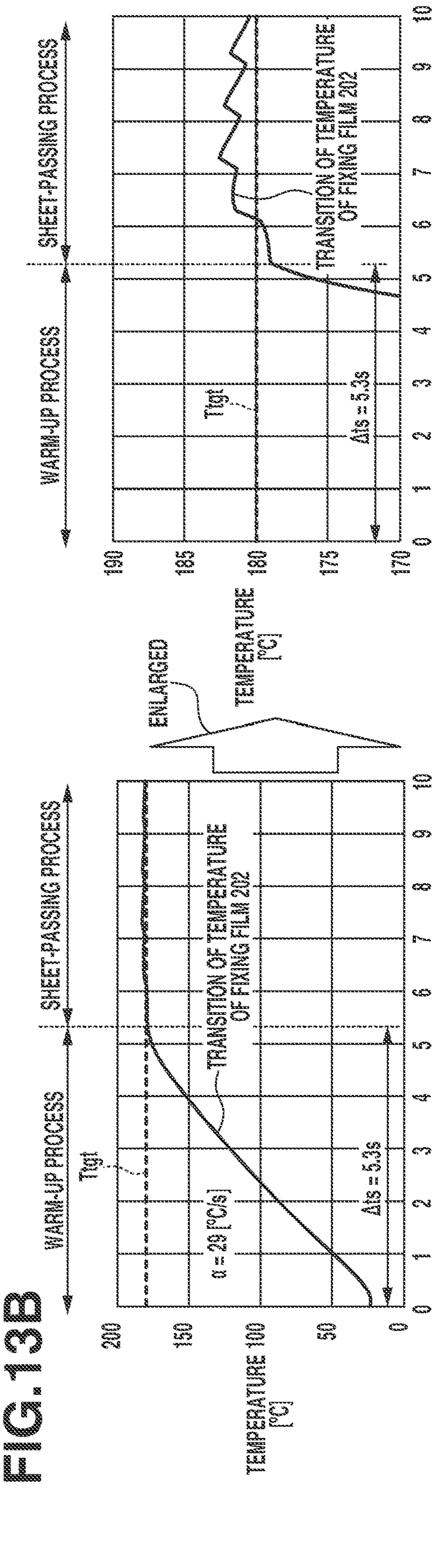
Figure 13C:
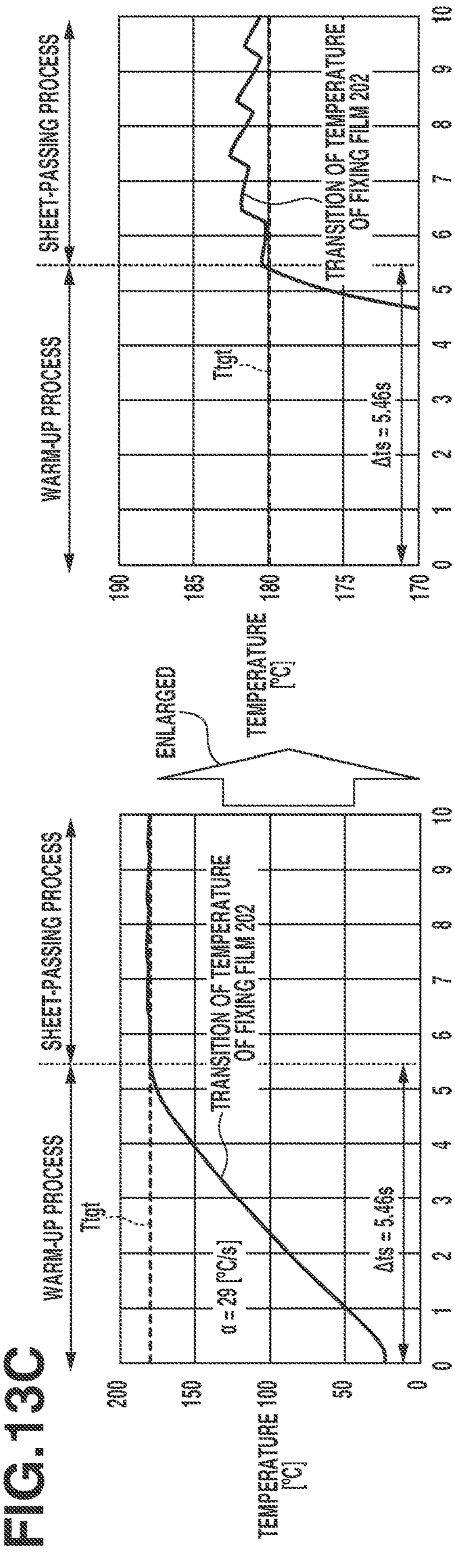
Figure 13D:
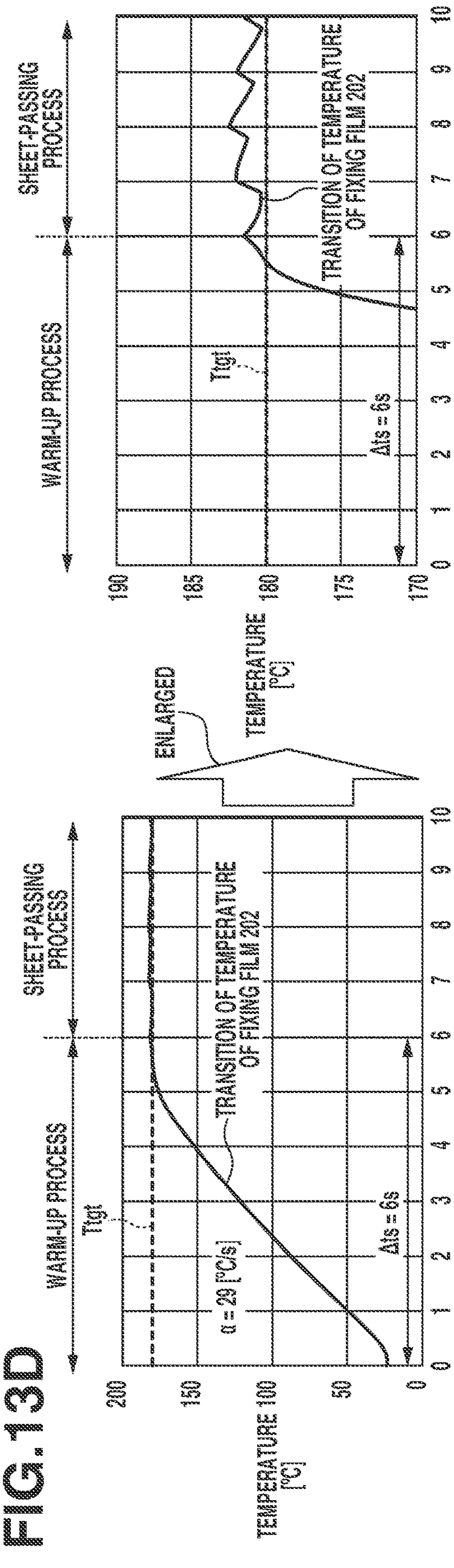

In FIGS. 13A and 13B, the recording material P enters the fixing nip portion N before the temperature of the fixing film 202 reaches the target temperature Ttgt, and there is a possibility that a fixing failure occurs. To prevent such a state, the engine controller 113, in the comparative example, needs to delay the instruction to start the print sequence so that a relation of Δts≥5.46 seconds holds. That is, there is no other choice but to increase the FPOT in the comparative example. While the time from the start of power supply to the heater 300 until the entry of the leading edge of the recording material P into the fixing nip portion N is 5.14 seconds at minimum in the present exemplary embodiment, the time is 5.46 seconds at minimum in the comparative example.

In this manner, also in the present exemplary embodiment, it is possible to provide the image forming apparatus capable of preventing the amount of overshooting from increasing while reducing the FPOT.

Figure 14:
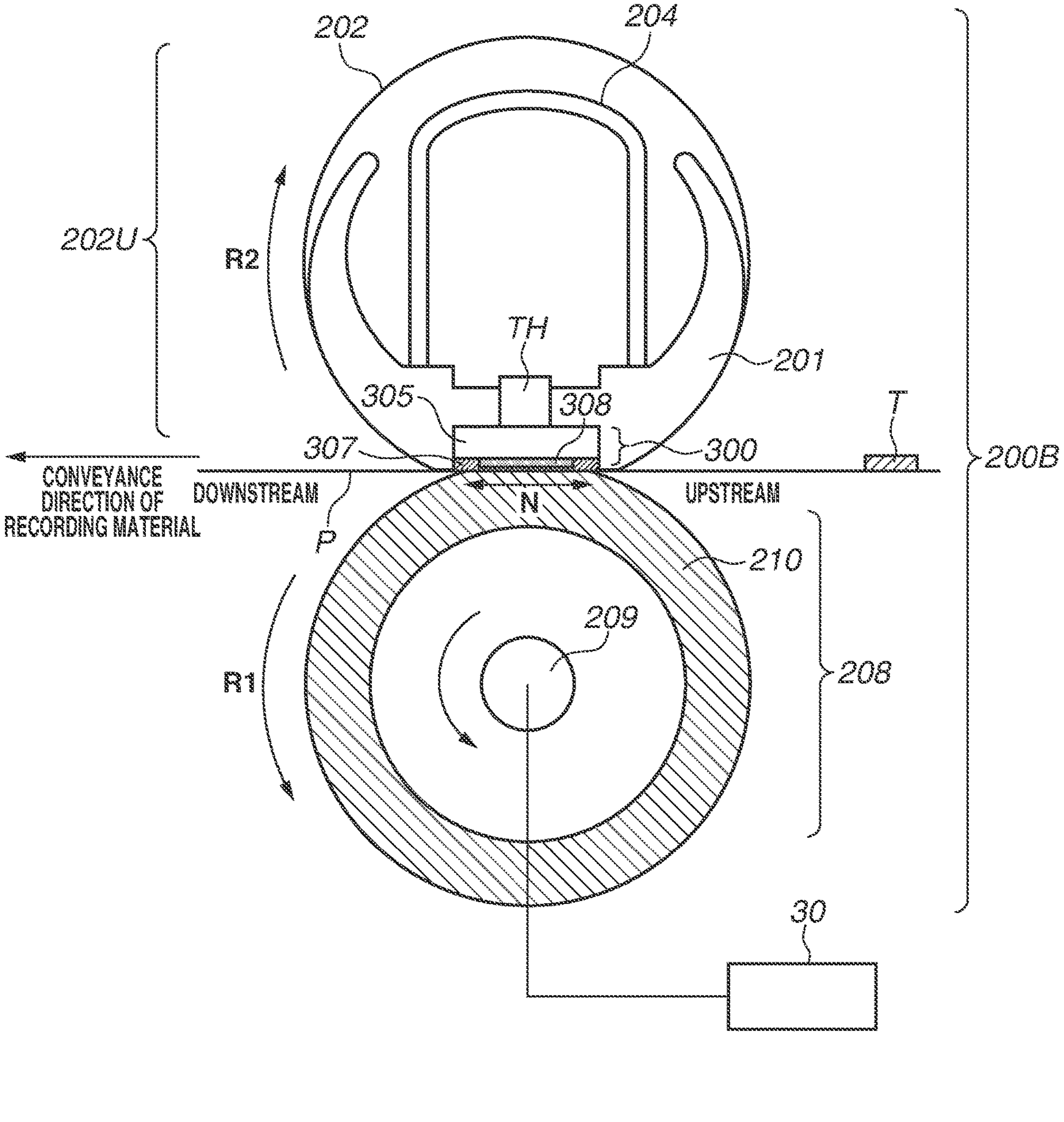
FIG. 14 is a cross-sectional view of a fixing unit according to a third exemplary embodiment.

A third exemplary embodiment is different from the first exemplary embodiment in that a temperature estimation unit, instead of the thermopile TF, estimates the temperature of the fixing film 202. As illustrated in FIG. 14, a fixing unit 200B according to the present exemplary embodiment does not include the thermopile TF.

(Temperature Estimation Unit)

The temperature estimation unit of the fixing film 202 according to the present exemplary embodiment will be described with reference to FIGS. 15A and 15B.

Figure 15A:
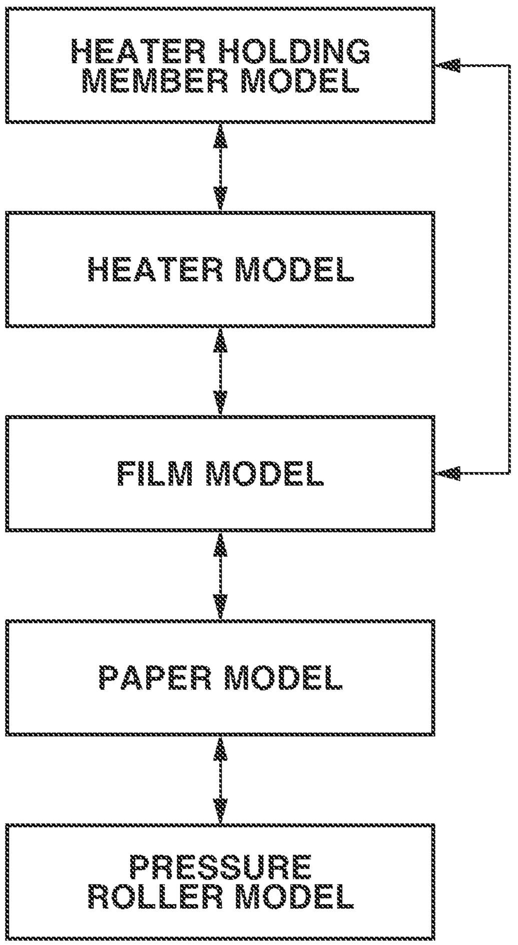
FIGS. 15A and 15B are diagrams each illustrating a temperature estimation unit according to the third exemplary embodiment.
Figure 15B:
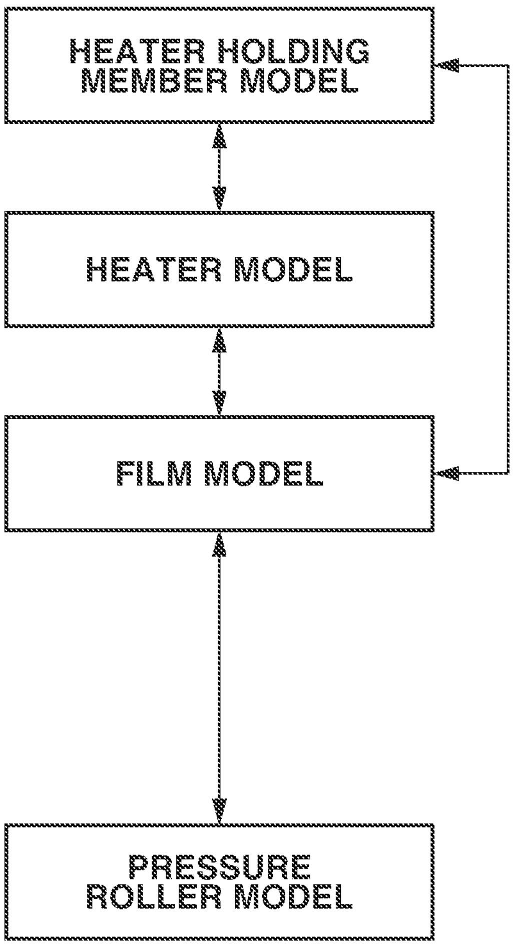

FIGS. 15A and 15B schematically illustrate a heat transfer path between members constituting the fixing unit 200B, and each arrow in FIGS. 15A and 15B represents the heat transfer path between members in contact with each other. FIG. 15A illustrates a model used when the recording material P passes through the fixing nip portion N. FIG. 15B illustrates a model used when the recording material P is not passing through the fixing nip portion N.

Expressions for estimating respective temperatures of models of the members in FIG. 15A at a time t are represented as the following Expressions (4) to (6), which are difference equations where a sampling time period is Δt (for example, 20 milliseconds). In addition, heat transfer coefficients αlf, αlh, αfh, αfp, and αrp are values that are fitted so that an error between a measurement value of the temperature of each member obtained by an experiment and an estimated value obtained by the following Expressions (4) to (6) becomes a minimum value.

$$\{Tl(t)-Tl(t-\Delta t)\}/\Delta t=\alpha lf\{Tf(t-\Delta t)-Tl(t-\Delta t)\}+\alpha lh\{Th(t-\Delta t)-Tl(t-\Delta t)\} \quad (4)$$

$$\{Tf(t)-Tf(t-\Delta t)\}/\Delta t=\alpha fh\{Th(t-\Delta t)-Tf(t-\Delta t)\}+\alpha fp\{Tp(t-\Delta t)-Tf(t-\Delta t)\} \quad (5)$$

$$\{Tr(t)-Tr(t-\Delta t)\}/\Delta t=\alpha rp\{Tr(t-\Delta t)-Tp(t-\Delta t)\} \quad (6)$$

In the Expressions, Tp is a recording material temperature, Tf is a film temperature, Th is a heater temperature, Tl is a heater holding member temperature, and Tr is a pressure roller temperature. Assume that a detection result from the thermistor TH is used as the heater temperature Th, and the recording material temperature Tp is 23° C.

Similarly, respective temperatures of models of members in FIG. 15B can be estimated by the following Expressions (7) and (8). The temperatures other than the film temperature and the pressure roller temperature are obtained by expressions that are similar to the expressions for obtaining the temperatures of the models in FIG. 15A. In addition, heat transfer coefficients αfr and αrf are values that are fitted so that an error between a measurement value of the temperature of each member obtained by an experiment and an estimated value obtained by the following Expressions (7) and (8) becomes a minimum value.

$$\{Tf(t)-Tf(t-\Delta t)\}/\Delta t=\alpha fh\{Th(t-\Delta t)\}-Tf(t-\Delta t)\}+\alpha fr\{Tr(t-\Delta t)-Tf(t-\Delta t)\} \quad (7)$$

$$\{Tr(t)-Tr(t-\Delta t)\}/\Delta t=\alpha rf\{Tf(t-\Delta t)\}-Tr(t-\Delta t)\} \quad (8)$$

The estimation of these temperatures is performed by the CPU 420 that also serves as the temperature estimation unit.

As described above, the temperature of the fixing film 202 is estimated, and the warm-up process except the estimation of the temperature of the fixing film 202 is executed according to the temperature adjustment control method identical to that in the first exemplary embodiment. The present exemplary embodiment also enables provision of the image forming apparatus capable of preventing the amount of overshooting from increasing while reducing the FPOT.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-027677, filed Feb. 25, 2022, which is hereby incorporated by reference herein in its entirety.

What is claimed is:

1. An image forming apparatus comprising:

an image forming unit configured to form a toner image on a recording material;

a fixing unit configured to heat and fix the toner image formed on the recording material to the recording material in a fixing nip portion, wherein the fixing unit includes a heater and a nip portion forming member configured to form the fixing nip portion to pinch and convey the recording material; and a control unit configured to control power to be supplied to the heater, wherein the control unit is configured to control the power to be supplied to the heater so as to change a temperature gradient at a time period of warm-up of the fixing unit to a target temperature in accordance with a time period from start of power supply to the heater until entry of the recording material into the fixing nip portion, and wherein, in a first case where the image forming unit forms the toner image on the recording material at a first process speed and the time period from start of power supply to the heater until entry of the recording material into the fixing nip portion is a first time period, the control unit controls the power to be supplied to the heater so that the temperature gradient at the time period of warm-up becomes a first gradient, and wherein, in a second case where the image forming unit forms the toner image on the recording material at the first process speed and the time period from start of power supply to the heater until entry of the recording material into the fixing nip portion is a second time period longer than the first time period, the control unit controls the power to be supplied to the heater so that the temperature gradient at the time period of warm-up becomes a second gradient smaller than the first gradient.

2. The image forming apparatus according to claim 1, wherein the nip portion forming member includes a film having a cylindrical shape and a roller that is in contact with an outer peripheral surface of the film, wherein the heater is arranged in an internal space of the film, and wherein the fixing nip portion is formed of the heater and the roller via the film.

3. The image forming apparatus according to claim 2, wherein the control unit is configured to change a value of a temperature gradient α=(Ttgt−Tini)/Δtw in accordance with a time period Δts from the start of power supply to the heater until entry of a leading edge of the recording material into the fixing nip portion, where Tini is a temperature of the film at the start of power supply to the heater, Ttgt is a temperature of the film at the entry of the leading edge of the recording material in a conveyance direction into the fixing nip portion, and Δtw is a time period from the start of power supply to the heater until temperature rise of the film to Ttgt.

4. The image forming apparatus according to claim 2, further comprising a first temperature detecting element for detecting a temperature of the film, and a second temperature detecting element for detecting a temperature of the heater, wherein the control unit controls the power to be supplied to the heater in accordance with the temperature detected by the first temperature detecting element and the temperature detected by the second temperature detecting element.

5. The image forming apparatus according to claim 2, further comprising a first temperature detecting element for detecting a temperature of the film, and a second temperature detecting element for detecting a temperature of the heater, wherein the control unit controls the power to be supplied to the heater in accordance with the temperature detected by the first temperature detecting element.

6. The image forming apparatus according to claim 2, further comprising a temperature detecting element for detecting a temperature of the heater, wherein the control unit controls the power to be supplied to the heater in accordance with the temperature detected by the temperature detecting element.

7. The image forming apparatus according to claim 1, wherein the first case is a monochrome image forming mode, and the second case is a full-color image forming mode.

8. An image forming apparatus comprising:

an image forming unit configured to form a toner image on a recording material;

a fixing unit configured to heat and fix the toner image formed on the recording material to the recording material in a fixing nip portion, wherein the fixing unit includes a cylindrical film, a heater provided in an inner space of the cylindrical film, and a roller that contacts an outer peripheral surface of the cylindrical film and is configured to form a fixing nip portion for pinching and to convey the recording material together with the heater via the cylindrical film; and a control unit configured to control power to be supplied to the heater, wherein, in a first case where the image forming unit forms the toner image on the recording material at a first process speed and a time period from start of power supply to the heater until entry of the recording material into the fixing nip portion is a first time period, the control unit controls the power to be supplied to the heater so that a temperature gradient of the cylindrical film at a time period of warm-up of the fixing unit becomes a first gradient, and wherein, in a second case where the image forming unit forms the toner image on the recording material at the first process speed and the time period from start of power supply to the heater until entry of the recording material into the fixing nip portion is a second time period longer than the first time period, the control unit controls the power to be supplied to the heater so that the temperature gradient of the cylindrical film at the time period of warm-up of the fixing unit becomes a second gradient smaller than the first gradient.

9. The image forming apparatus according to claim 8, wherein the control unit is configured to change a value of a temperature gradient $\alpha=(Ttgt-Tini)/\Delta tw$ in accordance with a time period $\Delta ts$ from the start of power supply to the heater until entry of a leading edge of the recording material into the fixing nip portion, where Tini is a temperature of the film at the start of power supply to the heater, Ttgt is a temperature of the film at the entry of the leading edge of the recording material in a conveyance direction into the fixing nip portion, and $\Delta tw$ is a time period from the start of power supply to the heater until temperature rise of the film to Ttgt.

10. The image forming apparatus according to claim 8, wherein the first case is a monochrome image forming mode, and the second case is a full-color image forming mode.

11. The image forming apparatus according to claim 8, further comprising a first temperature detecting element for detecting a temperature of the film, and a second temperature detecting element for detecting a temperature of the heater, wherein the control unit controls the power to be supplied to the heater in accordance with the temperature detected by the first temperature detecting element and the temperature detected by the second temperature detecting element.

12. The image forming apparatus according to claim 8, further comprising a first temperature detecting element for detecting a temperature of the film, and a second temperature detecting element for detecting a temperature of the heater, wherein the control unit controls the power to be supplied to the heater in accordance with the temperature detected by the first temperature detecting element.

13. The image forming apparatus according to claim 8, further comprising a temperature detecting element for detecting a temperature of the heater, wherein the control unit controls the power to be supplied to the heater in accordance with the temperature detected by the temperature detecting element.

* * * * *